(12) United States Patent
Sekiguchi et al.

(10) Patent No.: US 7,136,138 B1
(45) Date of Patent: Nov. 14, 2006

(54) LIQUID CRYSTAL DISPLAY DEVICE

(75) Inventors: Kanetaka Sekiguchi, Sayama (JP); Katsumi Aota, Tokorozawa (JP); Kozo Miyoshi, Kitamoto (JP); Yuichi Akiba, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/857,208

(22) PCT Filed: Apr. 20, 1999

(86) PCT No.: PCT/JP99/02104

§ 371 (c)(1),
(2), (4) Date: Jun. 22, 2001

(87) PCT Pub. No.: WO00/38020

PCT Pub. Date: Jun. 29, 2000

(30) Foreign Application Priority Data

Dec. 22, 1998 (JP) ................................. 10-364871
Jan. 29, 1999 (JP) ................................. 11-021540

(51) Int. Cl.
*G02F 1/01* (2006.01)
*G04C 21/00* (2006.01)

(52) U.S. Cl. .................. 349/162; 368/84; 368/205; 368/242

(58) Field of Classification Search ............ 368/82–84, 368/205, 223, 239–241; 349/162, 113, 114, 349/116, 61
See application file for complete search history.

(56) References Cited

U.S. PATENT DOCUMENTS

| | | | | |
|---|---|---|---|---|
| 3,989,541 A | * | 11/1976 | Brandhorst, Jr. | ............. 136/256 |
| 4,095,217 A | * | 6/1978 | Tani et al. | ..................... 345/87 |
| 4,234,947 A | * | 11/1980 | Matsumoto | .................. 368/287 |
| 5,431,741 A | * | 7/1995 | Sakaguchi et al. | .......... 136/244 |
| 5,841,738 A | * | 11/1998 | Kamei et al. | ................ 368/205 |
| 5,886,688 A | * | 3/1999 | Fifield et al. | ................ 345/206 |
| 5,963,282 A | * | 10/1999 | Battersby | ..................... 349/86 |
| 6,057,906 A | * | 5/2000 | Iwanaga et al. | ............. 349/182 |
| 6,067,277 A | * | 5/2000 | Dinger et al. | ................ 358/205 |
| 6,181,648 B1 | * | 1/2001 | Mafune et al. | ................ 368/84 |

(Continued)

FOREIGN PATENT DOCUMENTS

EP         58-149524        9/1983

(Continued)

OTHER PUBLICATIONS (1) European Patent Office Action dated Dec. 20, 2002.

(Continued)

*Primary Examiner*—John Vigushin
*Assistant Examiner*—Jeanne-Marguerite Goodwin
(74) *Attorney, Agent, or Firm*—Westerman, Hattori, Daniels & Adrian, LLP.

(57) ABSTRACT

A timepiece provided with a liquid crystal display panel (9) for displaying thereon at least one of time information (5) and calendar information (4), wherein a solar battery unit (12) is provided to face at least a part of a visual recognition side surface of the liquid crystal display panel (9) or an opposite-side (lower-side) surface thereof, the light being applied to a power generation portion of the solar battery unit (12) through a transmission portion of the liquid crystal display panel (9) to generate electric power or what is displayed on the liquid crystal display panel (9) being visually recognized through a transmission portion of the solar battery unit (12), a timepiece circuit and the liquid crystal display panel (9) being driven by utilizing the electric power generated by the solar battery unit (12).

39 Claims, 21 Drawing Sheets

U.S. PATENT DOCUMENTS

| | | |
|---|---|---|
| 6,268,558 B1 * | 7/2001 | Kubota ................. 136/244 |
| 6,295,108 B1 * | 9/2001 | Kaneko ................. 349/115 |
| 6,518,493 B1 * | 2/2003 | Murakami et al. ........ 136/257 |
| 6,518,944 B1 * | 2/2003 | Doane et al. ............ 345/87 |
| 6,791,905 B1 * | 9/2004 | Sekiguchi .............. 368/80 |

FOREIGN PATENT DOCUMENTS

| | | |
|---|---|---|
| EP | 60-147720 | 8/1985 |
| EP | 62-237429 | 10/1987 |
| EP | 0 867 787 A1 | 9/1998 |
| JP | 53-146664 | 12/1978 |
| JP | 56-77885 | 6/1981 |
| JP | 57-94964 | 6/1982 |
| JP | 58-160378 | 10/1983 |
| JP | 61-19284 | 2/1986 |
| JP | 62-165590 | 10/1987 |
| JP | 63-132458 | 8/1988 |
| JP | 3-67382 | 7/1991 |
| JP | 5-264757 | 10/1993 |
| JP | 10-39056 | 2/1998 |
| JP | 10-48358 | 2/1998 |
| JP | 10-96889 | 4/1998 |
| JP | 10-186064 | 7/1998 |
| JP | 11119190 A * | 4/1999 |

OTHER PUBLICATIONS (2) European Patent Office Action dated Sep. 3, 2003.
(3) European Patent Office Action dated Aug. 12, 2004.
European Search Report dated Jul. 11, 2002.

* cited by examiner

F I G. 2 1
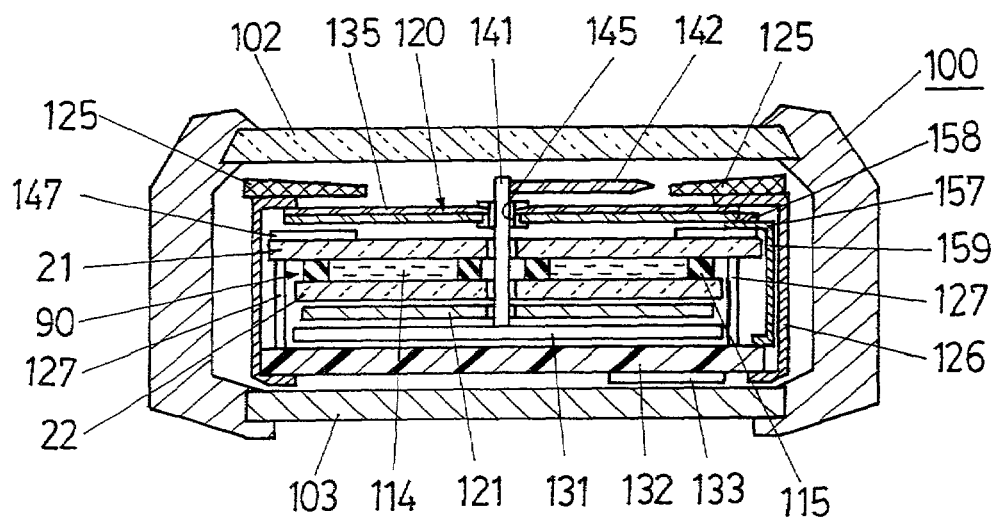
F I G. 2 2
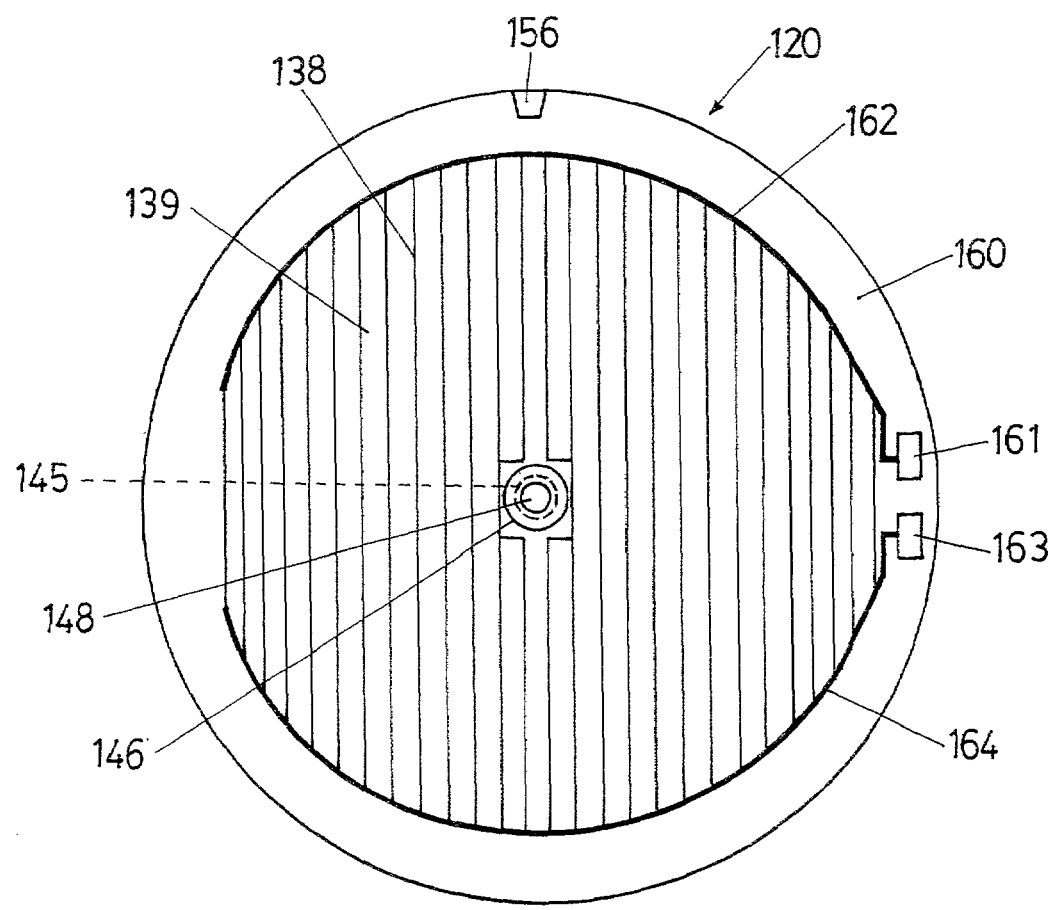

F I G. 2 6 A
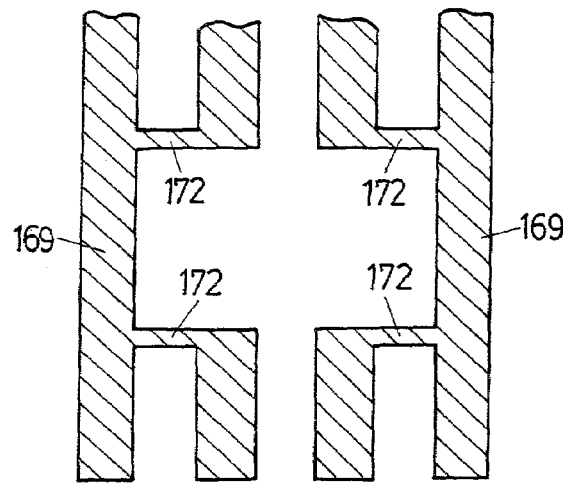
F I G. 2 6 B
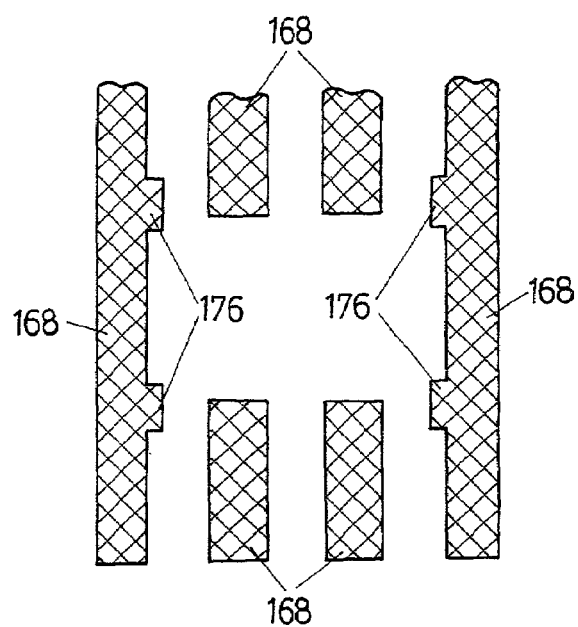
F I G. 2 6 C
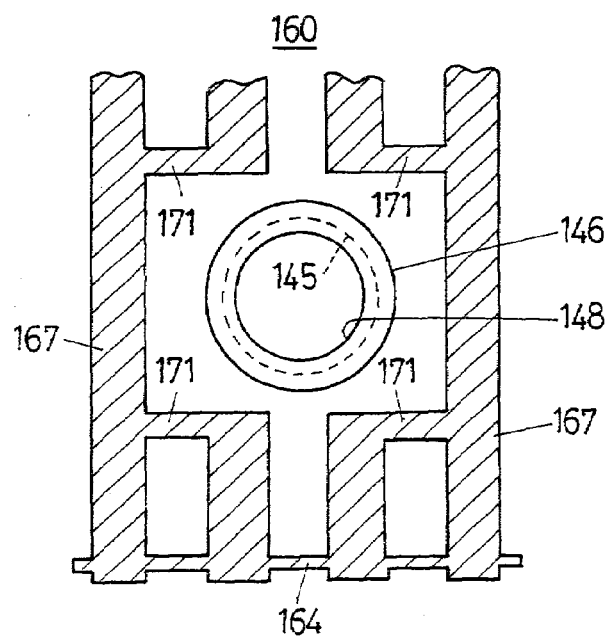

LIQUID CRYSTAL DISPLAY DEVICE

TECHNICAL FIELD

The present invention relates to a timepiece provided with a liquid crystal display panel for displaying at least one of time information and calendar information.

BACKGROUND TECHNOLOGY

In a timepiece for digitally displaying time information and calendar information, or in a combination timepiece made by combining the digital display of them and an analog display using hands, a liquid crystal display panel is used to perform the digital display.

In such a conventional timepiece using the liquid crystal display panel, a battery of simple consumption-type or charging-type is typically used as an energy source (electric power source), and additionally there is one type in which a solar battery is provided around the liquid crystal display panel, and electric power generated by it is accumulated in a secondary battery to use.

When the earth's environmental problems and energy problems are focused on, the simple consumption-type battery will have a serious problem in waste-disposal in the future, or the charging-type battery will have an energy consumption problem if it is charged through supply of electric power from an external power source.

Further, replacement of batteries is not preferable, especially for a timepiece, in maintaining a good waterproof state and in the prevention of the introduction of dust into its case. Further, a timepiece has low power consumption, and thus its timepiece system can be driven with little quantity of power generation. Therefore, it is preferable to install a solar battery in the timepiece to supply the entire or at least a part of the consumed electric power by power generation of the solar battery, thereby offering a great expectation of no waste produced and self-sufficient energy in the future.

In the timepiece using the conventional solar battery as the energy source, however, the solar battery is too conspicuous, and additionally it is necessary to secure a relatively large area for the solar battery, causing great restriction in visual design.

An example of a timepiece using a conventional solar battery as an energy source is explained here with reference to the drawings.

FIG. 35 is a schematic plan view showing an example of a conventional digital wristwatch with solar batteries. FIG. 36 is a schematic cross-sectional view taken along a line XXXVI—XXXVI in FIG. 35.

In this wristwatch, as shown in FIG. 35, a liquid crystal display panel 9 is disposed at the center of the upper surface of a watch case 1, and a number of solar batteries 15 are arranged in rows on both sides of the liquid crystal display panel 9.

The liquid crystal display panel 9 is provided with a chronograph display portion 3, a year-month-date display portion 4 and a time display portion 5. Further, four mode adjusting buttons 10 for correcting display contents, adjusting time and the like are provided on the side face of the watch case 1.

The watch case 1 seals the inner space with a cover glass 2 and a case back 7 as shown in FIG. 36.

In the watch case 1, the liquid crystal display panel 9 and fours solar batteries 15 provided on either side thereof are arranged inside the cover glass 2. A circuit board 6 is disposed below them, which includes a timepiece circuit operating by being supplied with electric power from the solar batteries 15, a drive circuit for driving the liquid crystal display panel 9, and the like.

Around the solar batteries 15 and the liquid crystal display panel 9, a panel cover 25 is provided, which shields electrodes and their outer forms.

In the liquid crystal display panel 9, a first substrate 21 and a second substrate 22, each of which is made of transparent glass or the like, are bonded together opposed each other with a predetermined gap interposed therebetween with spacers (not shown) and a sealing portion 23, and a liquid crystal layer 14 is sealed in the gap.

The opposed inner faces of the first substrate 21 and the second substrate 22 are provided with signal electrodes, opposed electrodes opposed to the signal electrodes to form pixel portions, and alignment films, though their illustration is omitted. A twisted nematic (TN) liquid crystal with a twist angle of 90 degrees is used for the liquid crystal layer 14.

In order to allow a change in alignment state of liquid crystal molecules caused by voltage applied to the liquid crystal layer 14 used in the liquid crystal display panel 9 to be viewed, a first polarizing film 16 and a second polarizing film 17 are bonded to the upper side of the first substrate 21 and the lower side of the second substrate 22 respectively with an acrylic resin. Each of the first and second polarizing films is an absorption-type polarizing film of which one polarizing optical axis is a transmission axis and a polarizing optical axis perpendicular thereto is an absorption axis, and the first polarizing film 16 and the second polarizing film 17 are arranged so that the respective transmission axes are perpendicular to each other.

This brings a portion where voltage is not applied between the signal electrode and the opposed electrode of the liquid crystal display panel 9 into a light transmission state, and a portion where voltage is applied into a light absorption state, thereby presenting a display.

Further, a translucent-type reflector 18 made by evaporating aluminum (Al) film to a transparent resin film is bonded to the lower side of the second polarizing film 17, and, opposed to that, an auxiliary light source 19 composed of an electro-luminescent (EL) element is provided on the circuit board 6.

When an external light source is dark, that is, when the environment of the watch in use is dark, the auxiliary light source 19 is turned on. Emitted light from the auxiliary light source 19 is made incident on the liquid crystal display panel 9 through use of transmission characteristics of the translucent-type reflector 18, presenting a transmission-type display.

When the external light source is bright, use of reflection characteristics of the translucent-type reflector 18 enables a reflection-type display.

A secondary battery 8 for accumulating electric power generated by the solar batteries 15 is provided on the back face side of the circuit board 6. These constituted a timepiece module having a function of generating electric power.

There also is a combination watch though the illustration thereof is omitted, which digitally displays lap time of a chronograph and a year, a month and a date by a liquid crystal display panel and includes an hour hand, a minute hand and further a second hand to analog-display time with the hands, in which solar batteries are annularly arranged at the peripheral portion of a dial, and electric power generated by the solar batteries is used as electric power for a liquid crystal display and drive of the hands.

In either structure of the conventional timepieces (watches), the solar batteries are viewed from the outside, which is not preferable in visual design. The liquid crystal display panel and the solar battery are located at different positions, making an outer form of the timepiece large as compared to the proportion of the display area of the liquid crystal display panel. Further, there also is a problem that a large display area of the liquid crystal display panel occupies a space where the solar battery is disposed.

DISCLOSURE OF THE INVENTION

The present invention is made in view of the above described technical background, and an object of the present invention is to obtain a function of generating electric power by a solar battery in an area of a liquid crystal display panel, to obtain a sufficient display area and a sufficient quantity of power generation even if the present invention is applied to a small-sized timepiece, to enable elimination of power supply from the outside and battery exchange, and further to provide a timepiece excellent in visual design with an unobtrusive solar battery.

In order to attain the above-described object, the timepiece according to the present invention is a timepiece provided with a liquid crystal display panel for displaying thereon at least one of time information and calendar information, wherein a solar battery is provided to face at least a part of a surface opposite to a visual recognition side of the liquid crystal display panel, and light is applied to the solar battery through a transmission portion of the liquid crystal display panel to generate electric power.

A film with substantially the same spectral reflectance as that of a power generation portion of the solar battery is provided on the visual recognition side of an electrode portion of the solar battery, allowing the electrode portion and the power generation portion to be viewed in the same color.

A film having substantially the same spectral reflectance as that of the power generation portion of the solar battery may be provided around the solar battery.

A film for changing a color of the solar battery may be provided between the solar battery and the liquid crystal display panel.

It is possible to make a part of a display region of the liquid crystal display panel a power generation quantity adjustment region for changing a transmittance to adjust a quantity of power generation of the solar battery.

It is preferable to provide means for conducting a control to increase a transmittance of the liquid crystal display panel to increase a quantity of power generation of the solar battery while the liquid crystal display panel is in a non-driving display state.

It is preferable to configure so that a display with low brightness by the liquid crystal display panel is performed using a low reflectance characteristic of the solar battery.

It is also preferable to configure so that a display is performed by a change in color of the liquid crystal display panel and a spectral reflection characteristic of the solar battery or the film.

It is possible that a mixed liquid crystal layer made by mixing a dichroic dye in a liquid crystal or a mixed liquid crystal layer containing a polymer in a liquid crystal is used for a liquid crystal layer of the liquid crystal display panel.

Alternatively, it is preferable that the liquid crystal layer is a twisted nematic liquid crystal layer or a super twisted nematic liquid crystal layer, polarizing films are provided on the visual recognition side and on the opposite side thereto respectively with the liquid crystal layer interposed therebetween, and the polarizing film provided on the opposite side to the visual recognition side is a reflection-type polarizing film, a cholesteric liquid crystal film, or a ¼ λ plate and a cholesteric liquid crystal polymer.

Further, it is preferable that the solar battery is formed in a unit having a transmission region for transmitting light and a power generation region for absorbing light to generate electric power. It is preferable that the power generation region is provided at a position facing a non-display region around a display pixel portion of the liquid crystal display panel, and the transmission region is provided at a position facing the pixel portion of the liquid crystal display panel.

It is also suitable that the power generation region of the solar battery is provided at a position facing at least a panel cover portion around a display region of the liquid crystal display panel, and the transmission region is provided at a position facing an inside of the display region of the liquid crystal display panel.

In these timepieces each using the solar battery unit having the transmission region, it is possible that an auxiliary light source is provided on a side of a surface opposite to a surface facing the liquid crystal display panel of the solar battery unit to allow light to be applied from the auxiliary light source through the transmission region of the solar battery unit to the liquid crystal display panel.

A timepiece is also provided, in which, conversely to the above-described timepiece, a solar battery unit is provided on a visual recognition side of the liquid crystal display panel so that at least a part of the solar battery unit overlaps the liquid crystal display panel, and the solar battery unit has a transmission portion and a power generation portion so that a display by the liquid crystal display panel is performed through the transmission portion.

It is preferable that a printed layer for cover is provided at a part of the visual recognition side of the solar battery unit.

The liquid crystal display panel may be constituted of a mixed liquid crystal layer composed of a liquid crystal and a transparent solid substance sealed in a gap between a first transparent substrate and a second transparent substrate.

A reflector may be provided on the opposite side to the solar battery unit with respect to the liquid crystal display panel. Further, it is preferable that an auxiliary light source is provided on the first substrate side (visual recognition side) of the liquid crystal display panel.

It is possible that an area ratio between the transmission portion and the power generation portion of the solar battery unit is different depending on a place of the liquid crystal display panel which the solar battery unit overlaps.

The solar battery unit may have a transparent substrate, and the transparent substrate has a scattering property within a region where the transparent substrate overlaps a portion of the liquid crystal display panel except for a display region.

It is preferable that a light guide portion for guiding light of an external light source to a display region of the liquid crystal display panel is provided at an outer peripheral portion of the solar battery unit.

It is desirable that a ratio of an area of the transmission portion with respect to a total area of the area of the transmission portion and an area of the power generation portion of the solar battery unit is 30% or more, and a width of the power generation portion is 100 micrometers (μm) or less.

It is desirable that light-shielding with respect to the liquid crystal display panel by the power generation portion of the solar battery unit is 20% or less of pixel portions of the liquid crystal display panel.

It is preferable that the power generation portion and the transmission portion are regularly arranged in stripes or in concentric circles.

It is possible that a circuit board connected to the solar battery unit and the auxiliary light source is provided, and a connection between the solar battery unit and the circuit board and a connection between the auxiliary light source and the circuit board are established through integrated connecting media composed of the same material.

It is preferable that an ultraviolet cut layer for preventing deterioration of the liquid crystal display panel is provided on the visual recognition side of the solar battery unit.

It is preferable that a wavelength conversion layer for converting light (ultraviolet light) with a wavelength less than 400 nanometers (nm) to light with a wavelength of 400 nanometers (nm) or greater is provided on the visual recognition side of the solar battery unit. Further, it is more preferable that an ultraviolet light cut layer for blocking the light with a wavelength less than 400 nanometers (nm) is provided between the wavelength conversion layer and the solar battery unit.

At least a part of a substrate of the solar battery unit or a cover glass of the timepiece may be a wavelength conversion layer for converting light with a wavelength less than 400 nanometers (nm) to light with a wavelength of 400 nanometers (nm) or greater.

In these timepieces, when a hand for indicating time is provided, the solar battery unit is provided with a through hole into which a shaft of the hand is inserted. Further, it is preferable that the solar battery unit and the liquid crystal display panel are provided with through holes into which a shaft of the hand is inserted at positions facing each other within portions where they overlap one upon another.

It is desirable that a resin portion for preventing breakage is provided at least on an inner peripheral surface of the through hole of a substrate of the solar battery unit.

In these timepieces, an auxiliary light source can be provided on the opposite side to the visual recognition side of the liquid crystal display panel.

Further, a plurality of solar battery units using light with different wavelengths at power generation portions thereof may be provided in laminated layers.

A solar battery unit can also be provided on the opposite side to the visual recognition side of the liquid crystal display panel in addition to the solar battery unit provided on the visual recognition side of the liquid crystal display panel.

Further, when the liquid crystal display panel has a liquid crystal layer coupled by a pair of transparent substrates and has a nonlinear resistance element on one of the substrates for switching a signal to a pixel portion, it is possible that a power generation portion of a solar battery is provided on the one substrate of the liquid crystal display panel, and semiconductor layers of the power generation portion and the nonlinear resistance element are formed of the same semiconductor.

The power generation portion of the solar battery can be provided directly on the one transparent substrate of the liquid crystal display panel.

At least the substrate on the solar battery side out of the pair of substrates of the liquid crystal display panel can be made of an organic material.

It is preferable that the power generation portion and the transmission portion of the solar battery unit are regularly arranged in stripes, and a pitch between adjacent power generation portions of the solar battery unit and a pitch between adjacent pixel portions of the liquid crystal display panel are substantially the same.

It is suitable that the liquid crystal display panel becomes any one of a scattering state, a transmission state and a reflection state when no voltage is applied thereto.

It is also possible that the power generation portion of the solar battery unit has a structure of sandwiching a semiconductor layer between two electrodes, and either of the two electrodes is made of a transparent conductive film.

BRIEF DESCRIPTION OF DRAWINGS

FIG. 21 is a schematic cross-sectional view taken along a line XXI—XXI in FIG. 20;

FIG. 22 is a schematic plan view of only a solar battery unit 120 in FIG. 20 and FIG. 21;

FIG. 26A, FIG. 26B and FIG. 26C are schematic plan views separately showing a second electrode, a power generating semiconductor layer and a first electrode constituting a power generation portion of the solar battery unit shown in FIG. 25;

BEST MODE FOR CARRYING OUT THE INVENTION

Hereinafter, preferred embodiments of a timepiece according to the present invention are explained with reference to the drawings.

Figure 1:
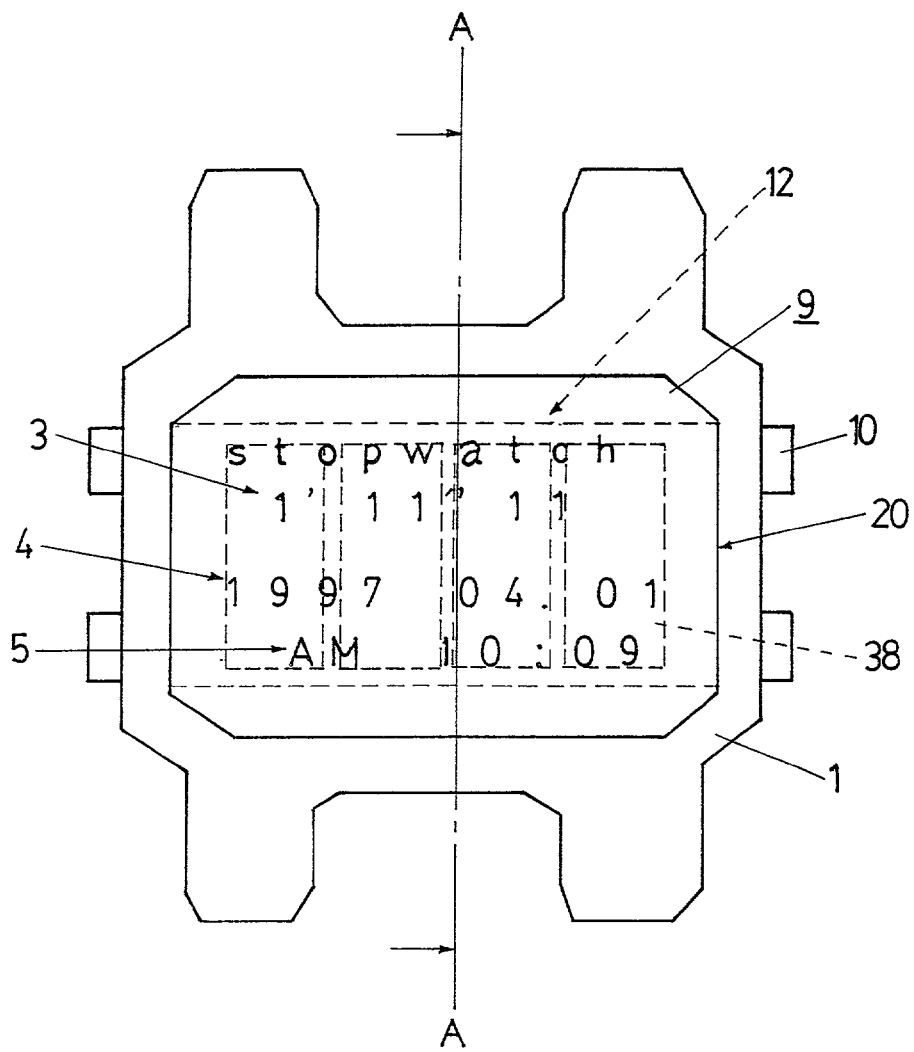
FIG. 1 is a schematic plan view showing a first embodiment of a timepiece according to the present invention.
Figure 2:
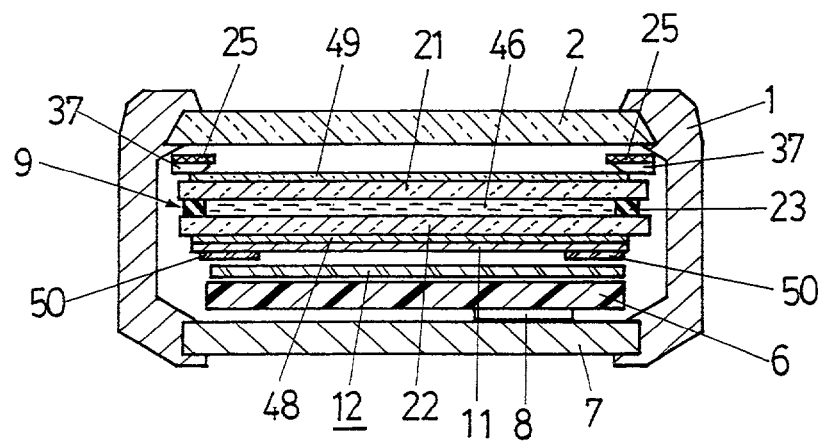
FIG. 2 is a schematic cross-sectional view taken along a line II—II in FIG. 1.

First Embodiment of Timepiece: FIG. 1 and FIG. 2

Figure 35:
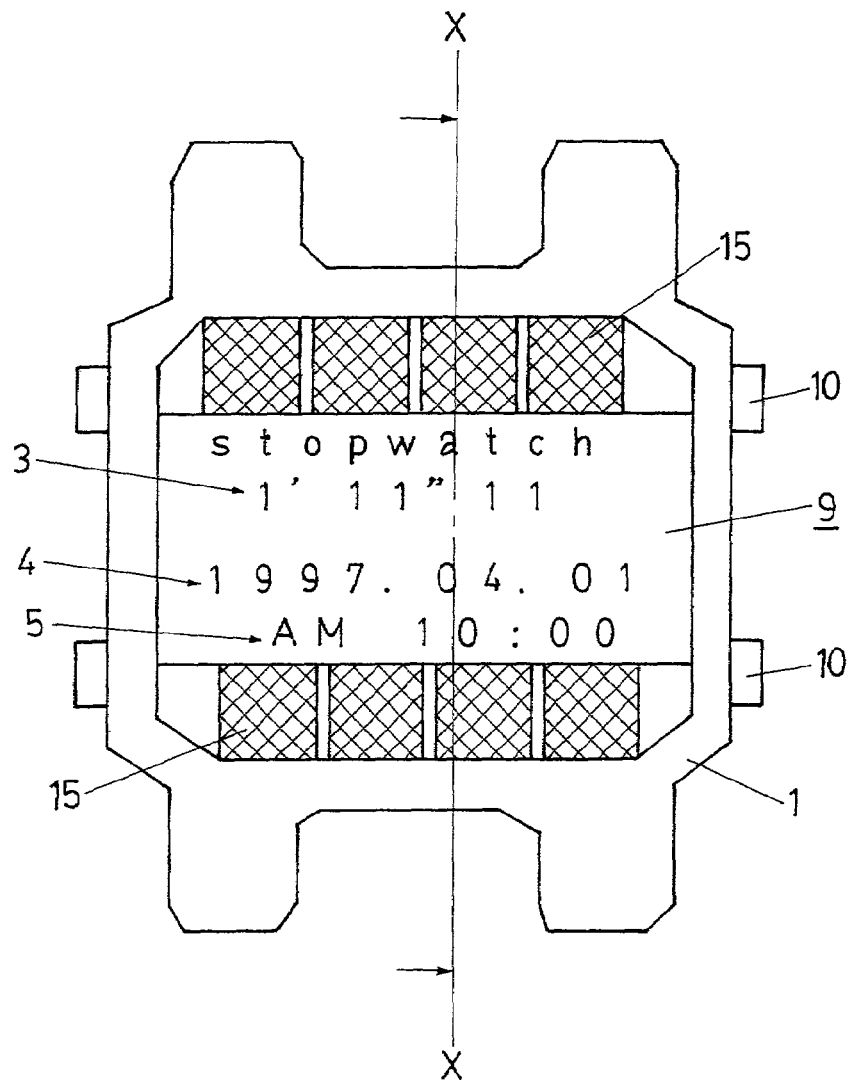
FIG. 35 is a schematic plan view showing an example of a conventional timepiece with solar batteries.
Figure 36:
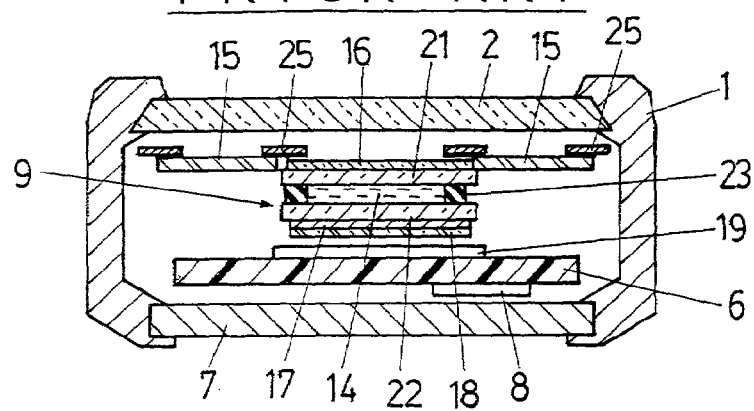
FIG. 36 is a schematic cross-sectional view taken along a line XXXVI—XXXVI in FIG. 35.

FIG. 1 is a schematic plan view showing the first embodiment of the timepiece according to the present invention, and FIG. 2 is a schematic cross-sectional view taken along a line II—II in FIG. 1, in which the same numerals are given to components identical to those in FIG. 35 and FIG. 36 of the above-described conventional example, and the description thereof is omitted.

This watch is greatly different from the above-described conventional watch with solar batteries in that a liquid crystal display device having a function of generating electric power is installed at a display portion for time or the like in place of the conventional liquid crystal display device.

More specifically, in the liquid crystal display device, a solar battery unit 12 including a plurality of power generation portions (solar batteries) are provided on the opposite side (lower side in FIG. 2) to the visual recognition side of a liquid crystal display panel 9 inside a watch case 1. Light is applied to power generation portions (solar batteries) 38 of the solar battery unit 12 through transmission portions of the liquid crystal display panel 9 to generate electric power.

The solar battery unit 12 is described below in detail, in which four blocks of power generation portions are formed on a common solar battery substrate as shown by broken lines in FIG. 1 and connected in series to enhance output voltage. Further, as shown in FIG. 2, a color film 11 is disposed above the solar battery unit 12 to change the color of the solar batteries, and formed with a reddish purple printed layer 50 at the peripheral portion.

The liquid crystal display panel 9 disposed above (visual recognition side of) the solar battery unit 12 is also described below, in which a liquid crystal layer 46 composed of a twisted nematic liquid crystal with a twist angle of 90° is sealed in a gap between first and second transparent substrates 21 and 22 with a sealing portion 23 and a closing material not shown, and a first polarizing film and a second polarizing film are disposed on the visual recognition side and on the opposite side to the visual recognition side respectively.

An upper auxiliary light source 37 and a panel cover 25 are provided on the visual recognition side of the peripheral potion of the liquid crystal display panel 9 as shown in FIG. 2.

Figure 3:
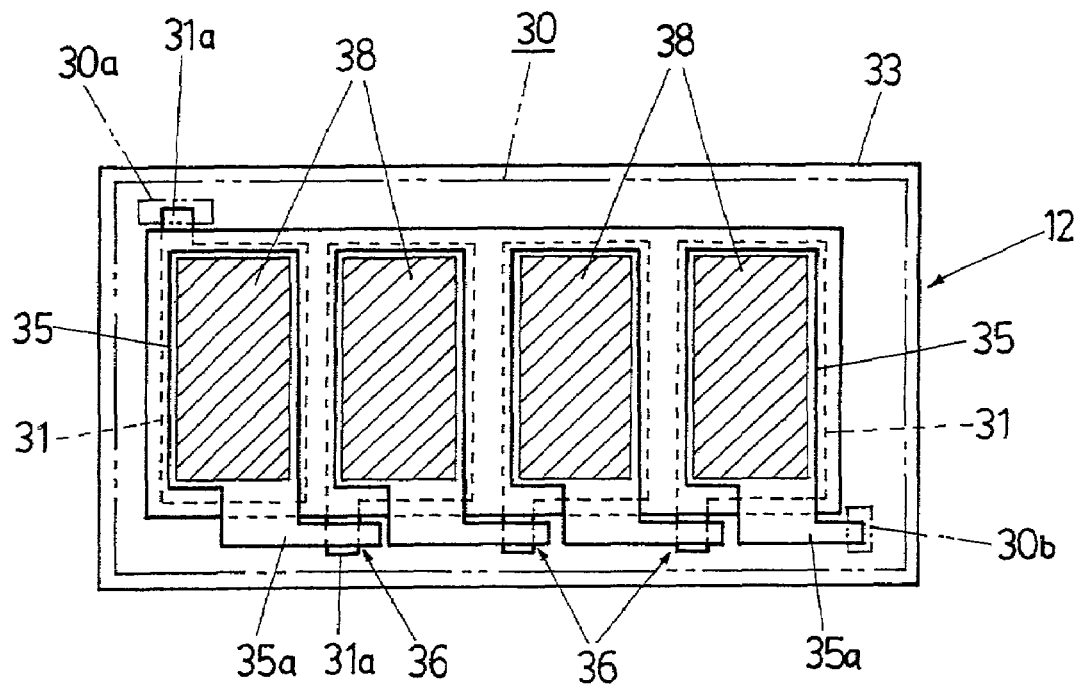
FIG. 3 is a schematic plan view of only a solar battery unit 12 in FIG. 1 and FIG. 2.
Figure 4:
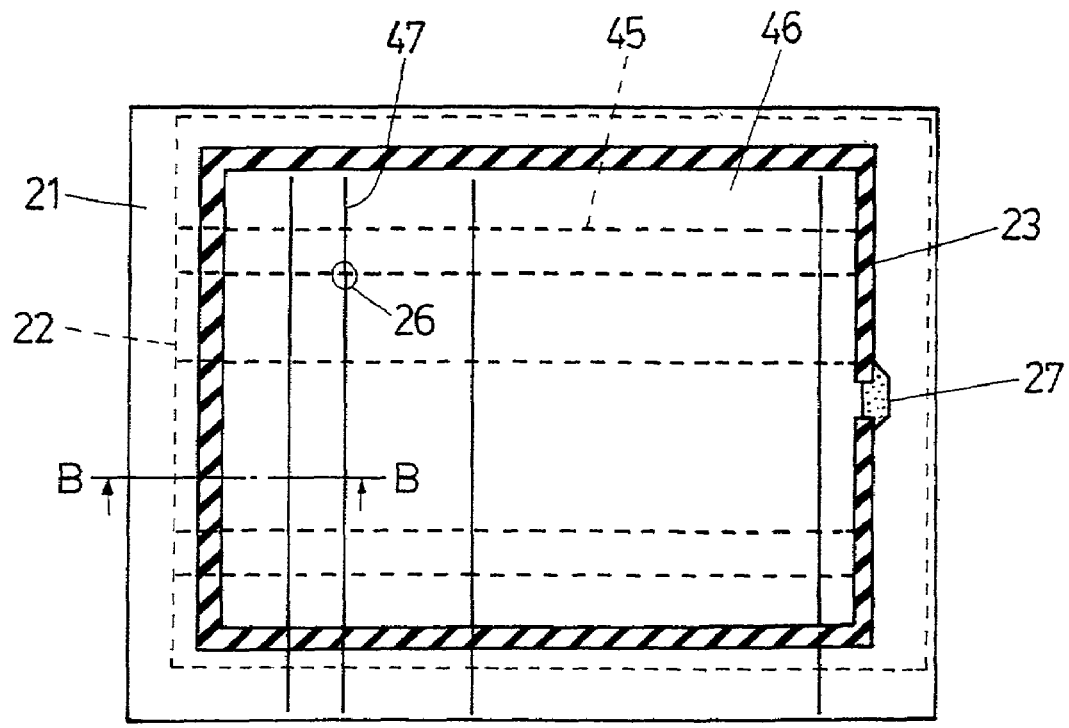
FIG. 4 is a schematic plan view of only a liquid crystal display panel 9 in FIG. 1 and FIG. 2.
Figure 5:
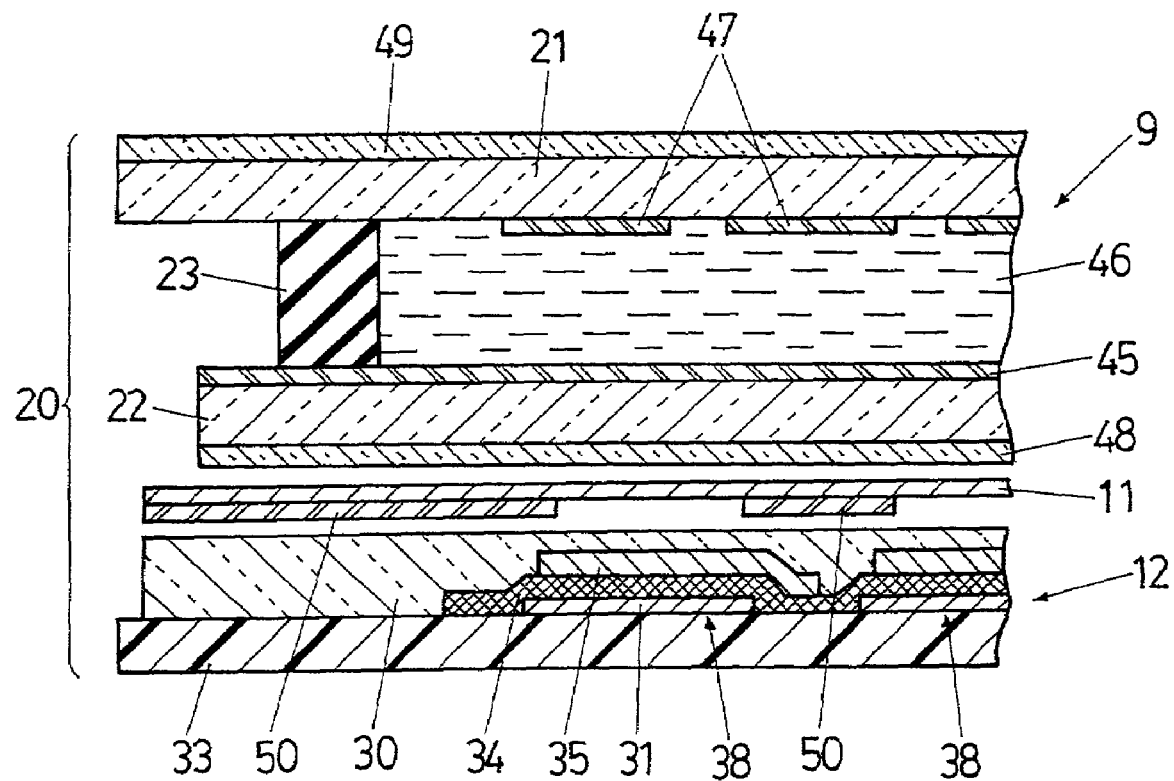
FIG. 5 is a schematic cross-sectional view showing a first structural example of a liquid crystal display device taken along a line V—V in FIG. 4.

First Structural Example of Liquid Crystal Display Device: FIG. 3 to FIG. 5

Next, structures of the solar battery unit 12 and the liquid crystal display panel 9 constituting the liquid crystal display device installed in this watch are explained in detail.

FIG. 3 is a schematic plan view of the solar battery unit 12, in which the power generation portions 38 are diagonally shaded to facilitate recognition. FIG. 4 is a schematic plan view of the liquid crystal display panel 9, and FIG. 5 is a schematic cross-sectional view of a liquid crystal display device 20 taken along a line V—V in FIG. 4.

In the solar battery unit 12 constituting a part of the liquid crystal display device 20, as shown in FIG. 3 and FIG. 5, a power generating semiconductor layer 34 having a PIN junction made of amorphous silicon (a-Si) of P-type, 1-type, N-type and the like is sandwiched between a first electrode (lower electrode) 31 which is provided on a solar battery substrate 33 and a second electrode (upper electrode) 35, thereby constituting the power generation portion (solar battery) 38.

As clearly shown in FIG. 3, four blocks of the power generation portions 38 are provided, and in each of the power generation portions 38, a first electrode connecting portion 31a and a second electrode connecting portion 35a are connected to each other at a joint portion 36 to increase output voltage.

Further, in order to prevent deterioration of the solar batteries, a protection layer 30 (FIG. 5) made of a polyimide resin is provided on the solar battery substrate 33 to cover the power generation portions 38. Furthermore, in order to establish an electric connection to a circuit board 6 shown in FIG. 2, wirings are connected to the first electrode connecting portions 31a and the second electrode connecting portions 35a respectively through openings 30a and 30b which are formed by removing the protection layer 30 on the solar battery substrate 33.

The color film 11 provided above the solar battery unit 12 is provided with the reddish purple printed layer 50 facing a portion other than the power generation portions 38.

In the liquid crystal display panel 9 disposed on the visual recognition side (observer side) of the solar battery unit 12, as shown in FIG. 4 and FIG. 5, the liquid crystal layer composed of a twisted nematic liquid crystal with a twist angle of 90° is sealed between the first and second transparent substrates 21 and 22 with the sealing portion 23 and a closing material 27. Further, data electrodes 47 each made of a transparent conductive film are formed in stripes on the inner surface of the first substrate 21 disposed on the visual recognition side, and scanning electrodes 45 each made of a transparent conductive film are formed in stripes, perpendicular to the data electrodes 47, on the inner surface of the second substrate 22 opposed to the first substrate 21 (see FIG. 4).

It should be noted that the data electrodes 47, the sealing portion 23 and the closing material 27 are provided on the back side of the first substrate 21, but the first substrate 21 is transparent, and thus they are shown by solid lines in FIG. 4.

Further, as shown in FIG. 5, a first polarizing film 49 is disposed on the outer surface (visual recognition side) of the first substrate 21 and a second polarizing film 48 on the outer surface (opposite side to the visual recognition side) of the second substrate 22, respectively. The first polarizing film 49 is an absorption-type polarizing film of which one optical axis is an absorption axis and an optical axis perpendicular thereto is a transmission axis. The second polarizing film 48 is a reflection-type polarizing film of which one optical axis is a reflection axis and an optical axis perpendicular thereto is a transmission axis.

The first polarizing film 49 and the second polarizing film 48 are arranged so that the respective transmission axes are perpendicular to each other, and the 90'-twisted nematic liquid crystal is used for the liquid crystal layer 46, whereby voltage is applied to the liquid crystal layer 46 within pixel portions 26 (see FIG. 4) constituted by intersections of the data electrodes 47 and the scanning electrodes 45 to control transmittance and reflectance, thereby performing a display.

The arrangement of the transmission axes of the first polarizing film (absorption-type polarizing film) 49 and the second polarizing film (reflection-type polarizing film) 48 to be perpendicular to each other brings about a transmission state by combination with the liquid crystal layer 46 when the voltage to the liquid crystal display panel 9 is off. Therefore, it becomes easy to apply light to the solar battery unit 12 while the liquid crystal display device 20 is not in use, thereby electric power is efficiently generated.

Further, the color film 11 having characteristics of transmitting light within a wavelength region matching with wavelengths absorbed by the power generation portions 38 of the solar battery unit 12 is provided between the liquid crystal display panel 9 and the solar battery unit 12.

A display by the liquid crystal display panel 9 is performed using transmission characteristics of the color film 11 having substantially the same transmission characteristics (spectral reflection characteristics) as absorption wavelength characteristics of the solar battery unit 12 caused by an increase in the transmittance, and reflection characteristics caused by an increase in reflectance. The printed layer 50 provided at a portion of the color film 11 facing the portion other than the power generation portions 38 on the solar battery unit 12 further increases the uniformity in the display by the liquid crystal display panel 9.

As described above, the reflection-type polarizing film is used as the second polarizing film 48, and the liquid crystal display panel 9 is given reflection characteristics, and, further, the display is performed using the absorption characteristics of the solar battery unit 12 and the color film 11, and the solar battery unit 12 is disposed on the back side of the liquid crystal display panel 9. Furthermore, the color film 11 which transmits light with substantially the same wavelengths as the wavelengths absorbed by the power generation region of the solar battery unit 12 is provided between the liquid crystal display panel 9 and the solar battery unit 12 and provided with the printed layer 50, thereby making it possible to bring the entire surface of the solar battery unit 12 to substantially the same color.

More than that, the solar battery unit 12 can be disposed on the back side of the liquid crystal display panel 9 without decreasing the power generation efficiency of the solar battery unit 12.

Moreover, the color film 11 is provided over the periphery of a display region (a region larger than the second substrate 22 shown in FIG. 4) constituted of clusters of the pixel portions 26 which are constituted by the intersections of the data electrodes 47 and the scanning electrodes 45 of the liquid crystal display panel 9, making it possible to make the display by the liquid crystal display panel 9 uniform.

Figure 6:
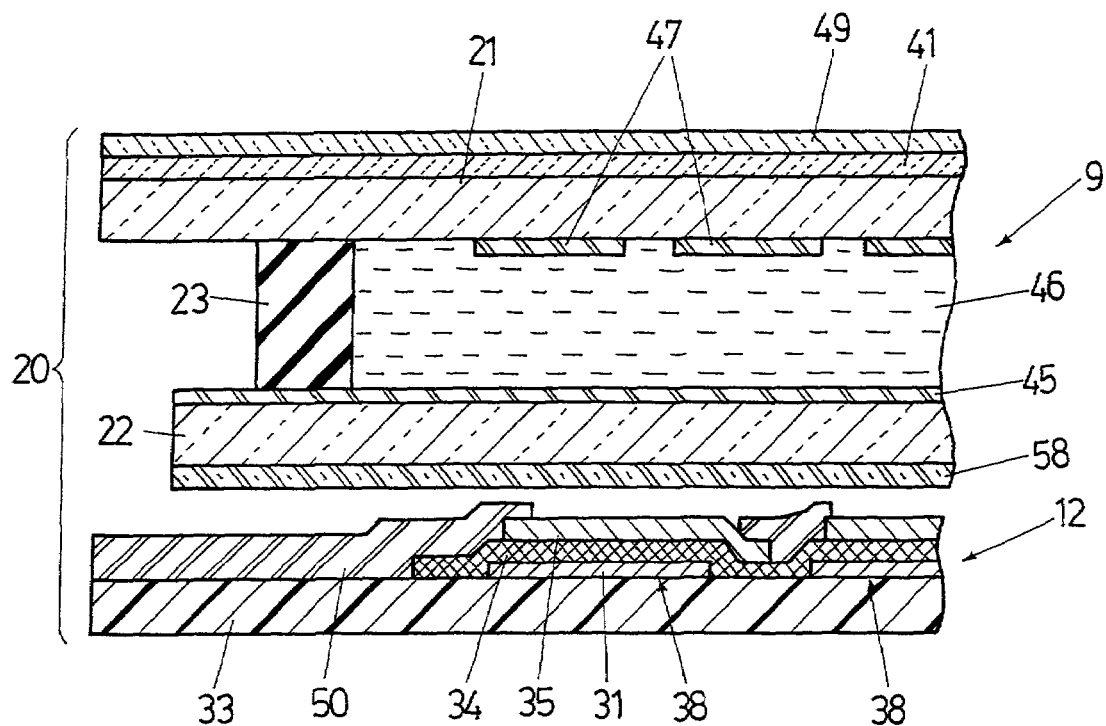
FIG. 6 is a schematic cross-sectional view showing a second structural example of the liquid crystal display device of the same.

Second Structural Example of Liquid Crystal Display Device: FIG. 6

Next, the second structural example of the liquid crystal display device installed in the timepiece according to the present invention is explained with FIG. 6. FIG. 6 is a cross-sectional view, similar to FIG. 5 of the first structural example, showing the structure of the liquid crystal display device, in which the same numerals are given to portions corresponding to those in FIG. 5.

In the liquid crystal display device 20, different from the first structural example, only a printed layer 50 is provided on a solar battery unit 12 with no color film 11 provided between a liquid crystal display panel 9 and the solar battery unit 12.

The solar battery unit 12 is constituted similarly to the first structural example, but a solar battery substrate 33 is not provided with a protection layer 30 thereon but with the printed layer 50 at a portion except for power generation portions 38.

In the liquid crystal display panel 9 disposed on the visual recognition side of the solar battery unit 12, a super twisted nematic liquid crystal with a twist angle of 240° is used as a liquid crystal layer 46 sealed between first and second transparent substrates 21 and 22. Further, a retardation film 41 is disposed between the first substrate and a first polarizing film 49 made of an absorption-type polarizing film, and a cholesteric liquid crystal film 58 for selectively reflecting light within a predetermined wavelength region of visible light is provided on the outer surface (opposite side to the visual recognition side) of the second substrate 22.

The first substrate 21, the first polarizing film 49 and the retardation film 41 are bonded together so that optical axes of the first polarizing film 49 made of the absorption-type polarizing film and the retardation film 41 are arranged to have an offset in angle, and that an orientation axis of the liquid crystal layer 46 composed of the super twisted nematic liquid crystal, an absorption axis of the first polarizing film 49 and a retardation axis of the retardation film 41 are arranged to have offsets in angle. Then, the angle of the cholesteric liquid crystal film 58 bonded to the second substrate 22 is arranged so that transmittance becomes a maximum when no voltage is applied.

This brings the liquid crystal display panel 9 to a transmission state when the applied voltage is off, thereby facilitating application of light to the solar battery unit 12 when the liquid crystal display device is not in use, electric power is efficiently generated.

The display by the liquid crystal display panel 9 is performed using absorption characteristics by the solar battery unit 12 and the printed layer 50 which has substantially the same absorption wavelength characteristics (spectral reflection characteristics) as those of the solar battery unit 12 caused by an increase in the transmittance, and, further, using selective reflection by the cholesteric liquid crystal film 58 caused by an increase in the voltage applied to the liquid crystal layer 46, and using reflection characteristics caused by an increase in reflectance. The formation of the printed layer 50 on the solar battery unit 12 can bring the power generation portions 38 of the solar battery unit 12 and the solar battery substrate 33 therearound to the same color tone, presenting a uniform color when the solar battery unit 12 is used as an absorption plate of the liquid crystal display panel 9. Further, the printed layer 50 is formed directly on the solar battery unit 12, resulting in improved alignment accuracy.

Furthermore, a wavelength of the selective reflection by the cholesteric liquid crystal film 58 is brought into a complementary color relationship with a wavelength contributing to power generation of the solar battery unit 12, whereby light with the wavelength contributing to the power generation of the solar battery unit 12 transmits the cholesteric liquid crystal film 58 even during the selective reflection of the cholesteric liquid crystal film 58 and is made incident on the solar battery unit 12, thereby improving the power generation efficiency and enhancing contrast ratio.

Figure 7:
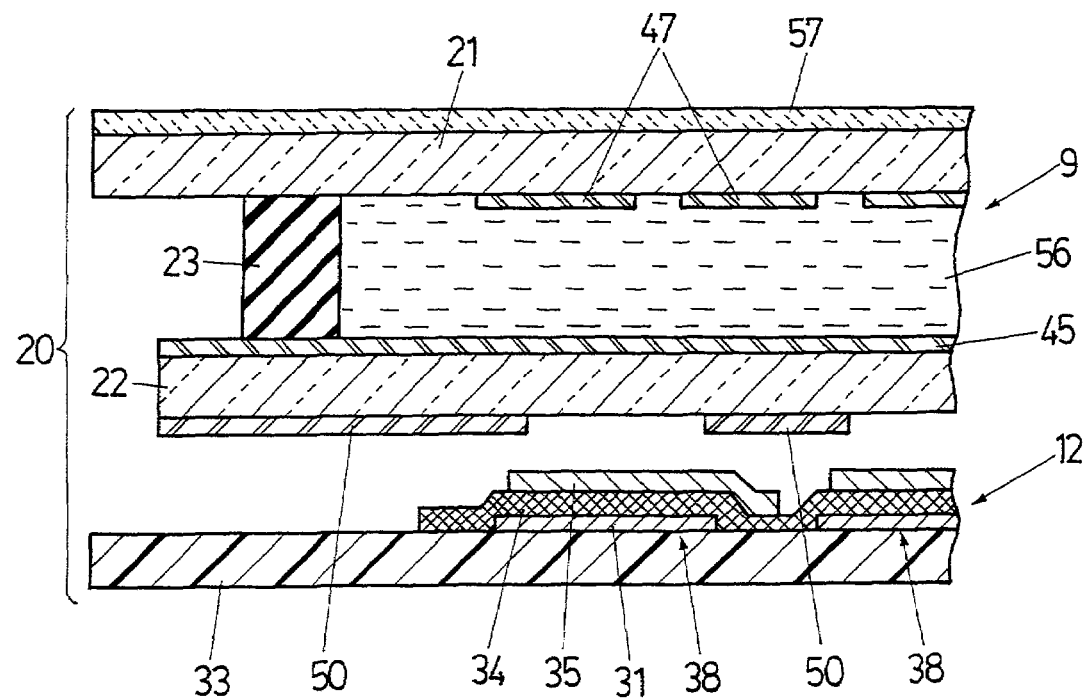
FIG. 7 is a schematic cross-sectional view showing a third structural example of the liquid crystal display device of the same.

Third Structural Example of Liquid Crystal Display Device: FIG. 7

Next, the third structural example of the liquid crystal display device installed in the timepiece according to the present invention is explained with FIG. 7. FIG. 7 is a cross-sectional view, similar to FIG. 5 of the first structural example, showing the structure of the liquid crystal display device, in which the same numerals are given to portions corresponding to those in FIG. 5.

This liquid crystal display device 20 is different from the first structural example in that a mixed liquid crystal layer 56 with a scattering property containing a liquid crystal and a polymer which is a transmitting polymer solid substance is used as the liquid crystal layer which is sealed between first and second transparent substrates of a liquid crystal display panel 9.

Further, the outer surface (visual recognition side) of a first substrate 21 is not provided with a first polarizing film 49 but an ultraviolet light cut film 57 for preventing application of ultraviolet light to the mixed liquid crystal layer 56. Furthermore, no second polarizing film 48 is disposed on the outer surface of the second substrate, and no color film 11 is provided between the second substrate and a solar battery unit 12, but a printed layer 50 is provided directly on the outer surface of a second substrate 22.

The display by the liquid crystal display panel 9 is performed using the absorption characteristics by the solar battery unit 12 and the printed layer 50 which is provided on the back side of the second substrate 22 and has substantially the same absorption wavelength characteristics (spectral reflection characteristics) as those of the solar battery unit 12 caused by an increase in the transmittance, and, further, an increase in the voltage applied to the mixed liquid crystal layer 56 enhances a scattering property caused by a difference in refractive index between the liquid crystal and the transmitting polymer solid substance, thereby causing a scattering in white.

The formation of the printed layer 50 on the second substrate 22 can bring power generation portions 38 of the solar battery unit 12 and a solar battery substrate 33 therearound to the same color tone, presenting a uniform color when the solar battery unit 12 is used as the absorption plate of the liquid crystal display panel 9.

Further, the printed layer 50 is closely contacted the second substrate 22 and thus a distance between the mixed liquid crystal layer 56 and the printed layer 50 becomes short, thereby preventing blurring of an image caused by double images.

Further, the mixed liquid crystal layer 56 containing the liquid crystal and the polymer which is the transmitting polymer solid substance is used for the liquid crystal layer, and its scattering property is controlled to perform a display, thereby increasing a contrast ratio with respect to a color absorbed by the solar battery unit 12, representing a bright display. Moreover, no polarizing film is used, thereby increasing the transmittance of the liquid crystal display panel, resulting in improved power generation efficiency of the solar battery unit 12.

A liquid crystal display panel having the same structure as that of the third structural example can also be constituted using a mixed liquid crystal layer made by mixing a liquid crystal and a dichroic dye for its liquid crystal layer. In this case, an absorption wavelength of the dichroic dye is given at least a difference of 0.1 on a chromaticity diagram (x, y) with respect to the absorption wavelength of the power generation portions 38 of the solar battery unit 12 or the printed layer 50, thereby improving visibility. In the liquid crystal display panel using the dichroic dye, no polarizing film is used, also improving the power generation efficiency of the solar battery unit 12.

Figure 8:
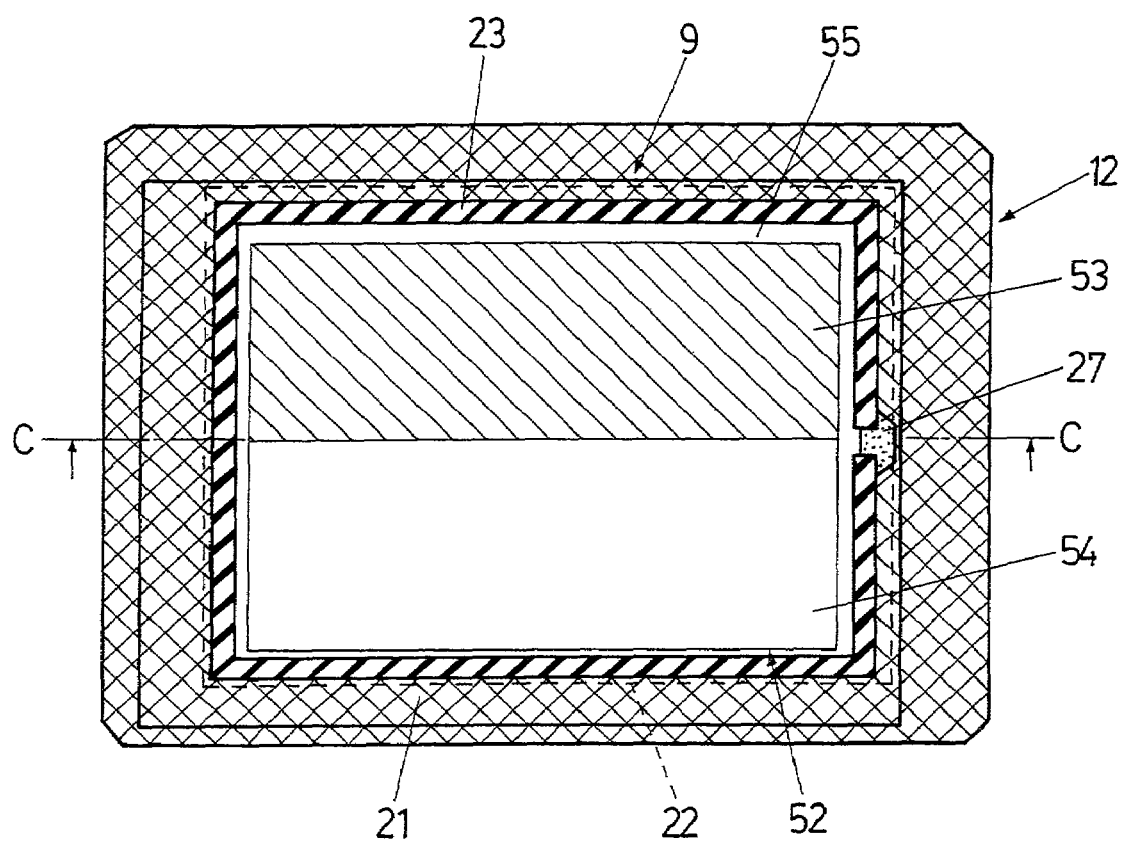
FIG. 8 is a schematic plan view showing a display state by a fourth example of the liquid crystal display device used in the timepiece according to the present invention.
Figure 9:
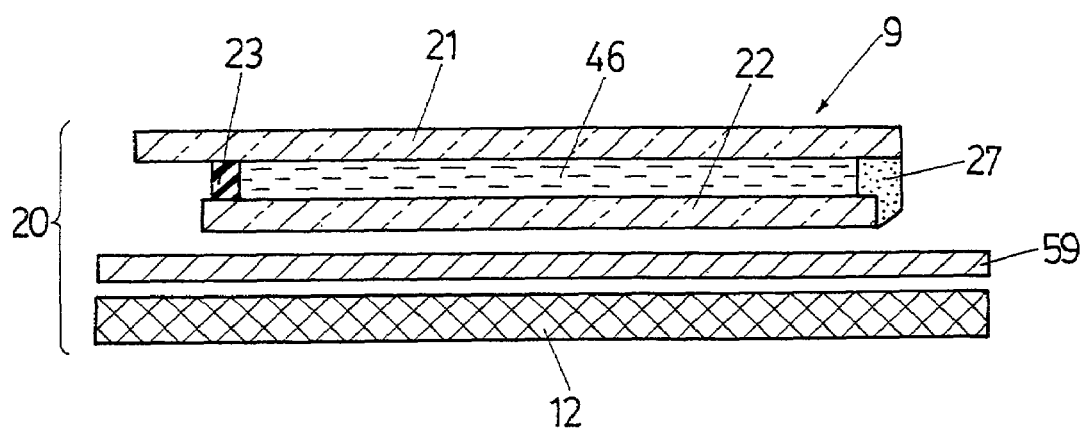
FIG. 9 is a schematic cross-sectional view taken along a line IX—IX in FIG. 8.
Figure 10:
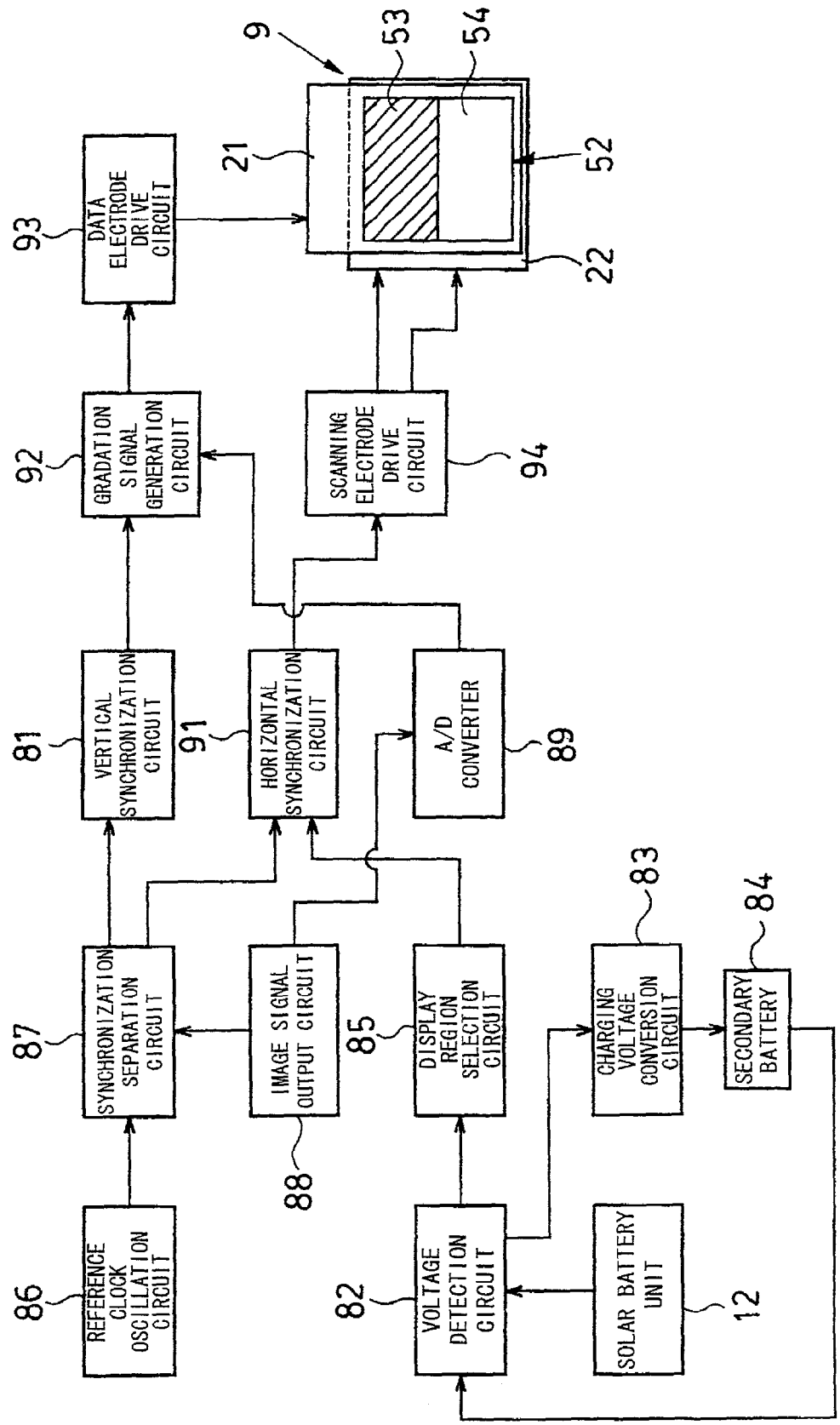
FIG. 10 is a block diagram showing a configuration of a liquid crystal display panel driving system of the liquid crystal display device shown in FIG. 8 and FIG. 9.

Fourth Structural Example of Liquid Crystal Display Device: FIG. 8 to FIG. 10

Next, the fourth structural example of the liquid crystal display device installed in the timepiece according to the present invention is explained with FIG. 8 to FIG. 10. This liquid crystal display device is configured such that when the quantity of power generation of a solar battery unit decreases, display contents on a liquid crystal display panel are changed to increase the quantity of application of light to the solar battery unit, thereby making it possible to control the quantity of power generation of the solar battery unit.

FIG. 8 is a schematic plan view showing a display state of the liquid crystal display device, and FIG. 9 is a schematic cross-sectional view taken along a line IX—IX in FIG. 8. In these drawings, the same numerals are given to portions corresponding to those in FIG. 3 and FIG. 5 of the first structural example.

The liquid crystal display device 20, as shown in FIG. 8 and FIG. 9, includes a liquid crystal display panel 9 and a solar battery unit 12, in which a color film 59 is disposed on the visual recognition side of an electrode portion (including wirings) of the solar battery unit 12 between the liquid crystal display panel 9 and the solar battery unit 12, for shielding the electrode portion. The color film 59 is a film having substantially the same spectral reflectance as that of the above-described power generation portion of the solar battery unit 12.

The liquid crystal display panel 9 is constituted by, from the visual recognition side, an absorption-type polarizing film (not shown), a first substrate 21, data electrodes and an alignment film (not shown), a liquid crystal layer 46, an alignment film and scanning electrodes (not shown), a second substrate 22, and a reflection-type polarizing film (not shown). The liquid crystal layer 46 is sealed between the first substrate 21 and the second substrate 22 with a sealing portion 23 and a closing material 27.

A whole display region 52 of the liquid crystal display panel 9 is constituted of clusters of pixel portions which are the intersections of the data electrodes on the first substrate 21 and the scanning electrodes on the second substrate 22. The whole display region 52 is constituted of an upper display region 53 and a lower display region 54, and a transmission region 55 provided around the upper display region 53 and the lower display region 54. Further, in this example, the solar battery unit, the printed layer and the color film are used for a dark display as in the above-described liquid crystal display devices, requiring no panel cover around the whole display region 52 in particular, and thus a structure is employed in which the color film 59 is disposed also around the solar battery unit 12 in place of the panel cover to increase the quantity of power generation.

A system block diagram for changing the display regions shown in FIG. 8 of the liquid crystal display panel 9 in the liquid crystal display device 20 is shown in FIG. 10.

As shown in FIG. 10, the quantity of power generation by electric energy converted from light energy by the solar battery unit 12 which is a power generation means is detected by a voltage detection circuit 82 and converted to a predetermined voltage by a charging voltage conversion circuit 83 in accordance with the quantity of power generation and accumulated in a secondary battery 84 which is a storage battery. Further the voltage detection circuit 82 detects the quantity of power generation of the solar battery unit 12 and a battery remaining capacity of the secondary battery 84, and a display region selection circuit 85 determines the number of scanning lines used for a display in accordance with the detection result.

Further, a synchronization separation circuit 87 divides a synchronization signal in an image signal outputted from an image signal output circuit 88 into a vertical synchronization signal to be inputted into a vertical synchronization circuit 81 and a horizontal synchronization signal to be inputted into a horizontal synchronization circuit 91 with reference to a reference clock generated by a reference clock oscillation circuit 86.

The image signal from the image signal output circuit 88 is inputted into a gradation signal generation circuit 92 through an A/D converter 89, and combined with the vertical synchronization signal from the vertical synchronization circuit 81 and inputted into a data electrode drive circuit 93, where driving signals are generated and applied to the data electrodes of the liquid crystal display panel 9.

On the other hand, signals for the number of the scanning lines which are selected by the display region selection circuit 85 are inputted into the scanning electrode drive circuit 94 through the horizontal synchronization circuit 91, and the scanning signals generated in the scanning electrode drive circuit 94 are applied to the scanning electrodes of the liquid crystal display panel 9.

Of the whole display region 52 of the liquid crystal display panel 9 constituted by the first substrate 21, the second substrate 22, the liquid crystal layer and the like, the upper display region 53 always performs a display as a display region selected by the display region selection circuit 85, and the lower display region 54 stops performing a display as required to increase the transmittance, thereby improving power generation efficiency of the solar battery unit 12.

As described above, the number of the scanning lines contributed to the display is selected by the display region selection circuit 85 in accordance with the quantity of power generation of the solar battery unit 12 or the battery remaining capacity of the secondary battery 84, and the whole display region 52 is divided into the region 53 where a display is performed and the region 54 where a display is stopped to increase the transmittance to control the transmittance of the liquid crystal display panel 9, thereby making it possible to control the quantity of power generation of the solar battery unit 12.

Further, in the liquid crystal display device, the liquid crystal display panel 9 is configured so that its transmittance becomes high where no voltage is applied thereto for both improvement of the transmittance of the liquid crystal display panel 9 and reduction in power consumption thereof.

For example, in the case in which the absorption-type polarizing film, the reflection-type polarizing film and the twisted nematic liquid crystal layer are used, the absorption-type polarizing film and the reflection-type polarizing film are arranged so that the respective transmission axes are perpendicular to each other. Further, in the case in which the mixed liquid crystal layer containing a dichroic dye in a liquid crystal is used, the dichroic dye is aligned in a direction of less absorption when no voltage is applied thereto. In the case in which the mixed liquid crystal layer containing a transmitting polymer solid substance in a liquid crystal is used, a mode in which the transmittance increases when no voltage is applied thereto is employed.

Figure 11:
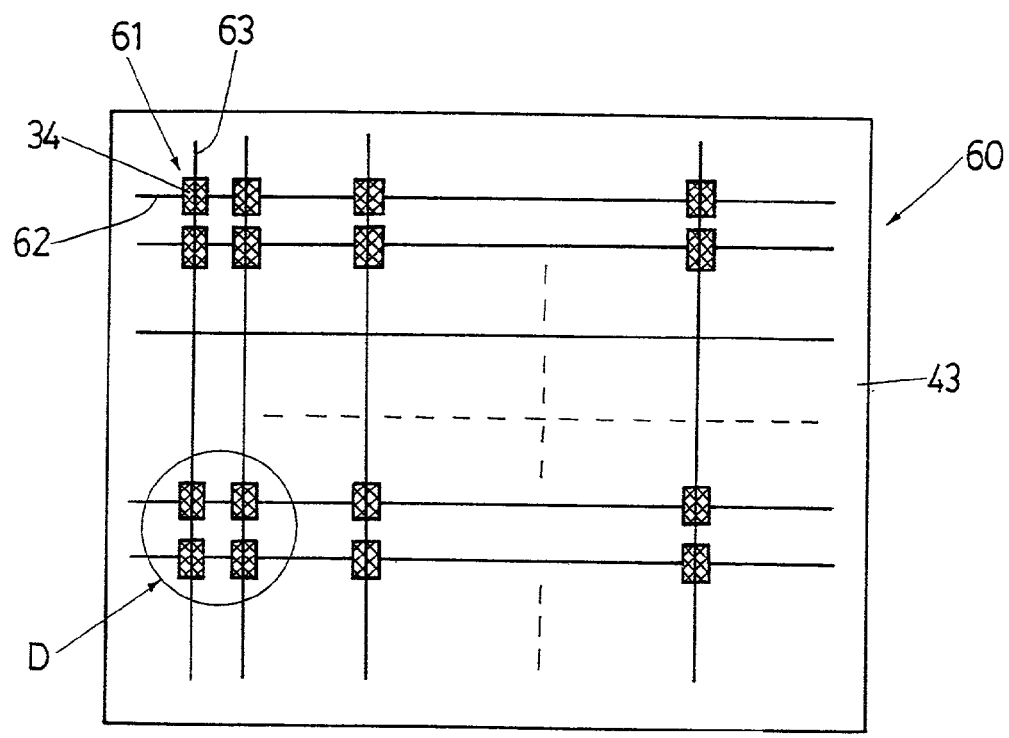
FIG. 11 is a schematic plan view showing a solar battery unit of a fifth structural example of the liquid crystal display device used in the timepiece according to the present invention.
Figure 12:
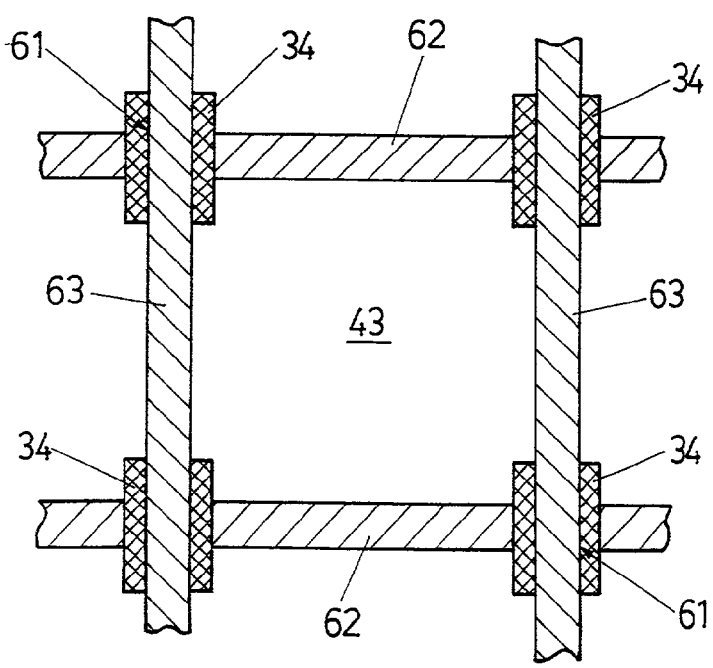
FIG. 12 is an enlarged view of a portion surrounded by a circle XII in FIG. 11.
Figure 13:
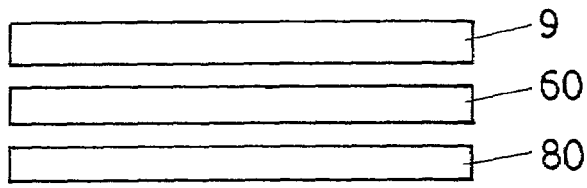
FIG. 13 is a schematic side view of a liquid crystal display device in which a solar battery unit shown in FIG. 11 is combined with a liquid crystal display panel and an auxiliary light source.

Fifth Structural Example of Liquid Crystal Device: FIG. 11 to FIG. 13

Next, as the fifth structural example of the liquid crystal display device installed in the timepiece according to the present invention, a liquid crystal display device provided with a solar battery unit including a solar battery substrate 33 which is a transparent substrate, a power generation region for absorbing light to generate electric power and a transmission region for transmitting light is explained using FIG. 11 to FIG. 13.

FIG. 11 is a schematic plan view of the solar battery unit having the power generation regions and the transmission regions, and FIG. 12 is an enlarged view of a part enclosed in a circle D in FIG. 11. FIG. 13 is a schematic side view of a liquid crystal display device in which the solar battery unit shown in FIG. 11 is combined with a liquid crystal display panel and an auxiliary light source.

In a solar battery unit 60 shown in FIG. 11 and FIG. 12, a plurality of first electrodes (lower electrodes) 62 each made of an indium tin oxide (ITO) film which is a transparent conductive film and a plurality of second electrodes (upper electrodes) 63 each similarly made of an indium tin oxide (ITO) film which is a transparent conductive film are formed in stripes on a transparent solar battery substrate 43 so that the first electrodes 62 are perpendicular to the second electrodes 63. At intersections of the first electrodes 62 and the second electrodes 63, power generating semiconductor layers 34 each of which is isolated like an island and made of an amorphous silicon (a-Si) film having a PIN junction are provided to be sandwiched between the first electrodes 62 and the second electrodes 63, thereby constituting power generation portions 61 as the power generation regions respectively.

The plurality of the first electrodes 62 are connected to each other, and the plurality of the second electrodes 63 are connected to each other, thereby making it possible to obtain predetermined voltage and current by power generation of the power generation portions 61. Regions other than the power generation portions 61 on the transparent solar battery substrate 43, in which only the first transparent electrodes 62 and the second transparent electrodes 63 are formed on the transparent solar battery substrate 43, are transmission regions for transmitting light.

Therefore, as shown in FIG. 13, any of the liquid crystal display panels 9 shown in the above-described structural examples is disposed on the visual recognition side of the solar battery unit 60, and an auxiliary light source 80 is disposed on the opposite-surface side to the surface facing the liquid crystal display panel 9 of the solar battery unit 60, so that light from the auxiliary light source 80 is applied to the liquid crystal display panel 9 through the transmission regions of the solar battery unit 60, enabling a bright display even when there is no external light or short of light at night or the like.

In this case, it is preferable that the power generation regions (the power generation portions 61) of the solar battery unit 60 are provided at positions facing non-display regions around the display pixel portions of the liquid crystal display panel 9, and the transmission regions are provided at positions facing the display pixel portions of the liquid crystal display panel 9.

Alternatively, it is also preferable that the power generation regions (the power generation portions 61) of the solar battery unit 60 are provided at least at positions facing the panel cover portion around the display region of the liquid crystal display panel 9, and the transmission regions are provided at positions facing the inside of the display region of the liquid crystal display panel 9.

Figure 14:
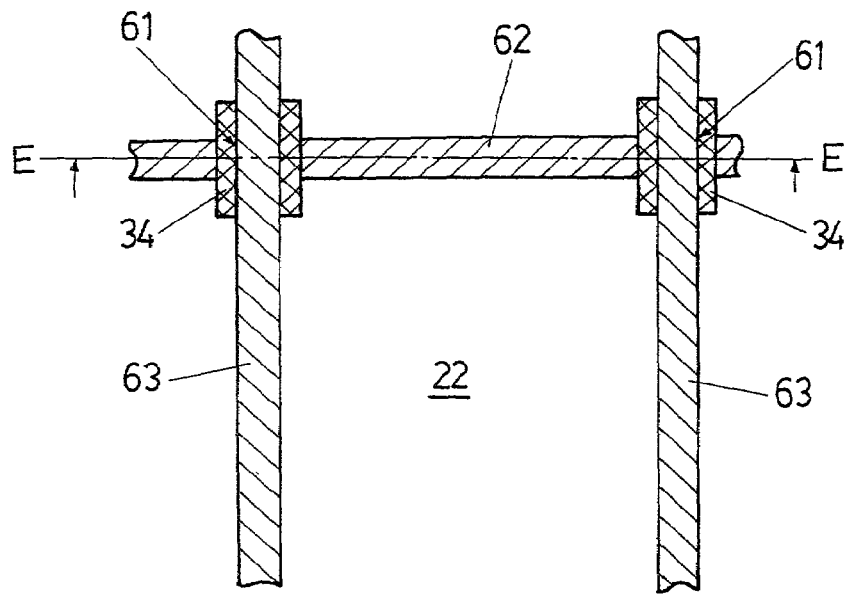
FIG. 14 is a schematic plan view showing a part of a portion constituting a solar battery unit of a sixth structural example of the liquid crystal display device used in the timepiece according to the present invention.
Figure 15:
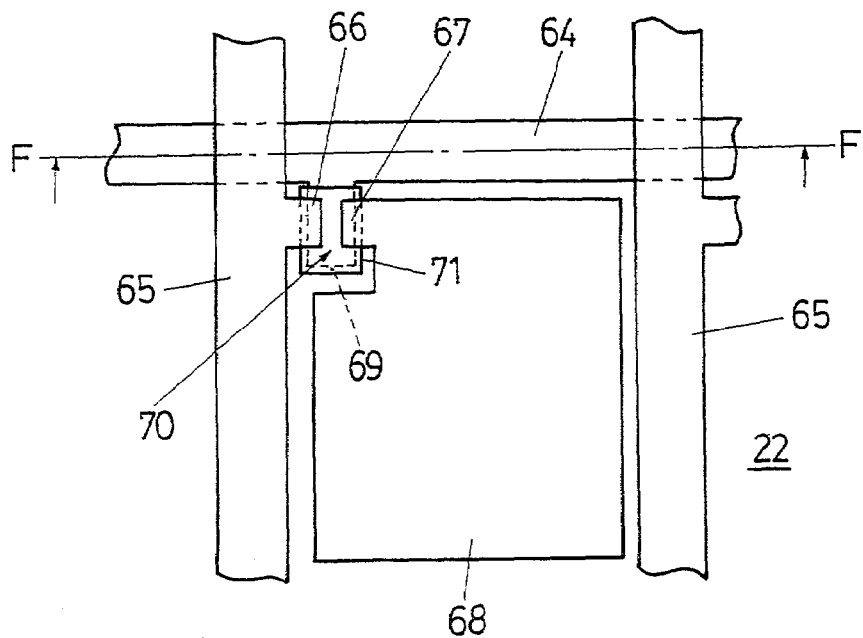
FIG. 15 is a schematic plan view showing electrodes and a thin film transistor for one pixel of the liquid crystal display panel in the liquid crystal display device of the same.
Figure 16:
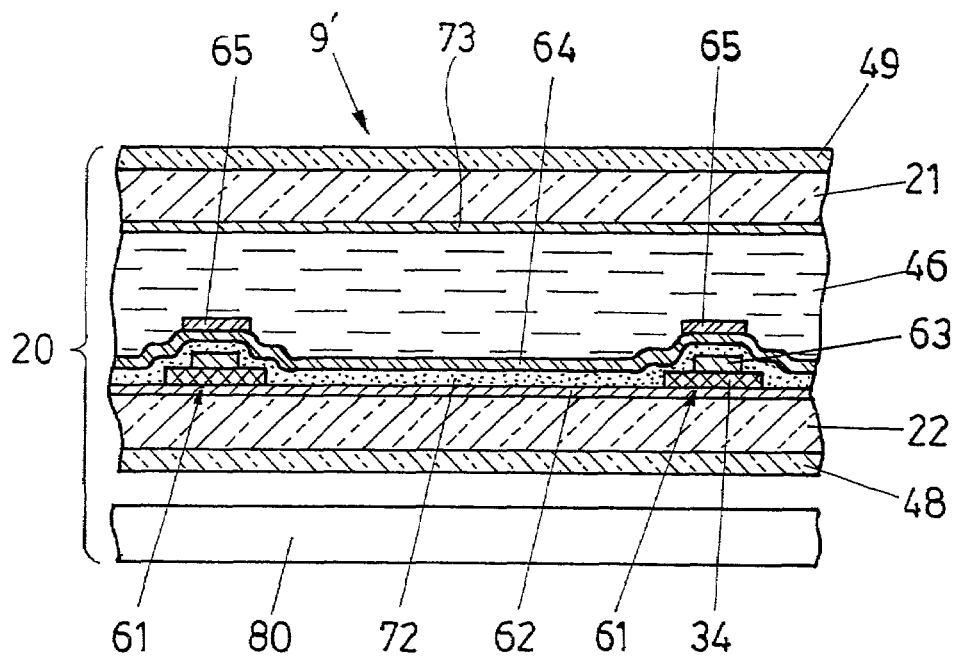
FIG. 16 is a schematic cross-sectional view of the liquid crystal display device taken along a line XVI—XVI in FIG. 14 and FIG. 15.

Sixth Structural Example of Liquid Crystal Display Panel: FIG. 14 to FIG. 16

Next, the sixth structural example of the liquid crystal display device installed in the timepiece according to the present invention is explained with FIG. 14 and FIG. 16. This liquid crystal display device is constituted by installing a solar battery unit into a liquid crystal display panel with thin film transistors (TFT), each of which is a three-terminal type active element as a nonlinear element for switching a signal to a pixel portion, provided on one of substrates (active substrates) sandwiching a liquid crystal layer.

FIG. 14 is a schematic plan view showing a part of a portion constituting the solar battery unit in the liquid crystal display device, FIG. 15 is a schematic plan view showing electrodes and the thin film transistor for one pixel of the liquid crystal display panel, and FIG. 16 is a schematic cross-sectional view of the liquid crystal display device taken along a line XVI—XVI in FIG. 14 and in FIG. 15.

The solar battery unit shown in FIG. 14 has the same structure as that of the solar battery unit 60 in the fifth structural example shown in FIG. 11 and FIG. 12, in which power generating semiconductor layers 34 each made of an amorphous silicon (a-Si) film are sandwiched at intersections of a plurality of first electrodes 62 and a plurality of second electrodes 63 respectively, thereby constituting a large number of power generation portions (solar batteries) 61.

However, in this solar battery unit, as shown in FIG. 16, a second transparent substrate 22 (a substrate disposed on the opposite side to the visual recognition side) of a liquid crystal display panel 9' also serves as a solar battery substrate, and, the first electrodes 62, the power generating semiconductor layers 34 and the second electrodes 63 which are described above are formed on the second substrate 22, thereby providing the large number of the power generation portions (solar batteries) 61 at positions facing non-display regions around the display pixel portions of the liquid crystal display panel 9'.

Further, a transparent insulating film 72 is formed over the entire surface of the second substrate formed with the solar battery unit, and scanning electrodes 64, data electrodes 65, display electrodes 68 and thin film transistors 70 which are shown in FIG. 15 are formed on the insulating film 72.

More specifically, the scanning electrodes 64 are arranged above the first electrodes 62 of the solar battery unit, and the data electrodes 65 are arranged above the second electrodes 63. The scanning electrode 64 is formed with a gate electrode 69 protruding, a gate insulating film (not shown) is disposed on the gate electrode 69, and an amorphous silicon (a-Si) film 71 is formed on the gate insulating film. Further, the data electrode 65 is disposed above the second electrode 63 of the solar battery unit, a source electrode 66 connecting to the data electrode is provided extending onto the amorphous silicon (a-Si) film 71, and a drain electrode 67, which is provided on the amorphous silicon (a-Si) film 71 with a predetermined gap interposed with respect to the source electrode 66, is provided extending from the display electrode 68. The insulating film not shown is formed on the front face of the scanning electrode 64 to prevent direct conduction to the data electrode 65 at the intersection.

The display electrode 68, as shown in FIG. 15, is formed of an indium tin oxide (ITO) film which is a transparent conductive film above the insulating film 72 almost entirely within each region of one pixel surrounded by the scanning electrodes 64 and the data electrodes 65.

An amorphous silicon (a-Si) film (not shown) containing impurity ions is provided between the amorphous silicon (a-Si) film 71 and the source electrode 66 or the drain electrode 67.

The above-described gate electrode 69, amorphous silicon (a-Si) film 71, source electrode 66, drain electrode 67 and the like constitute the thin film transistor (TFT) as a nonlinear element for switching a signal to the display electrode which is the pixel portion.

A liquid crystal layer 46 composed of a twisted nematic liquid crystal is sealed between the second substrate 22 formed with the above-described components and the first substrate with opposed electrodes 73 each made of an indium tin oxide (ITO) film, which is a transparent conductive film, formed on the entire inner surface thereof opposed to the second substrate 22, and a first polarizing film (an absorption-type polarizing film) 49 is disposed on the visual recognition side of the first substrate 21 and a second polarizing film (reflection-type polarizing film) 48 is disposed on the opposite side to the visual recognition side of the second substrate 22, thereby constituting the liquid crystal display panel 9' having a function of generating electric power.

A predetermined voltage is applied between the scanning electrode 64 and the data electrode 65 of this liquid crystal display panel 9' to apply a voltage between the display electrode 68 and the opposed electrode 73 which is disposed opposed thereto with the liquid crystal layer 46 interposed therebetween, thereby performing a display. Since the liquid crystal layer 46 around the display electrode 68 has no change by signal, an effective display can not be performed there. Therefore, the first electrodes 62 and the second electrodes 63 of the solar battery unit are arranged around the display electrode 68.

Further, the power generating semiconductor layer 34 is disposed on the back side of the scanning electrode 64 and the data electrode 65 which are transparent electrodes connected to each other through the thin film transistor (TFT), thereby supplying predetermined light energy to the solar battery unit without influence exerted upon its display performance.

Further, as shown in FIG. 16, for example, an electro-luminescent light (EL) is disposed on the opposite side (lower side in FIG. 16) to the visual recognition side of the liquid crystal display panel 9' as an auxiliary light source 80, thereby making it possible to apply light emitted by the auxiliary light source 80 to the visual recognition side through the transmission regions of the solar battery unit.

Accordingly, in a bright environment, external light of a liquid crystal display device 20 is applied to the power generation portions 61 of the solar battery unit, thereby generating electric power. Further, when the outside is dark, the auxiliary light source 80 is turned on, the light emitted by the auxiliary light source 80 is applied to the visual recognition side through the transmission portions of the solar battery unit, thereby enabling a bright display.

Figure 17:
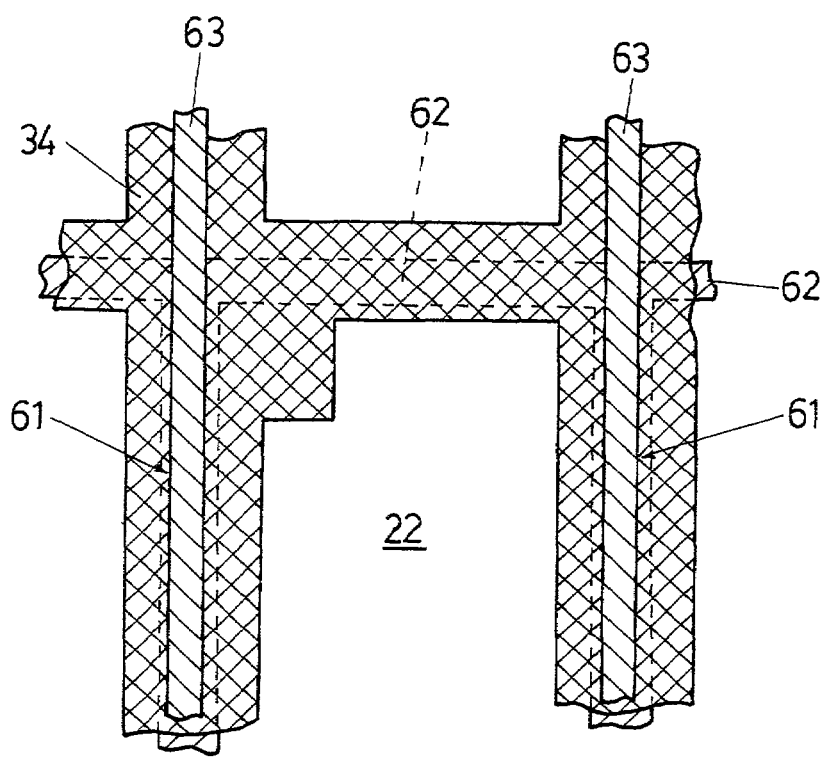
FIG. 17 is a schematic plan view of a part of the solar battery unit showing a modification of the sixth structural example of the liquid crystal display device.

Modification of Sixth Structural Example: FIG. 17

The solar battery unit may be structured as shown in FIG. 17 as a partially changed example of the sixth structural example. Incidentally, the same numerals are given to portions in FIG. 17 corresponding to those in FIG. 14. The structures of the scanning electrode 64, the data electrode 65 and the thin film transistor 70 of the liquid crystal display panel overlapped on the solar battery unit through the insulating film are the same as those shown in FIG. 15.

In the solar battery unit, the first electrodes (lower electrodes) 62 formed on the second substrate 22 of the liquid crystal display panel 9' are partially arranged in a lattice shape as shown by broken lines in FIG. 17 with parts thereof in stripes extending in a vertical direction in the drawing partially cut off. In other words, FIG. 17 just shows a boundary part between the cut-off part and the lattice part.

On the first electrodes 62, a power generating semiconductor 34 made of an amorphous silicon (a-Si) film is formed on the entire region except for the display electrodes 68 shown in FIG. 15, on which the second electrodes (upper electrodes) 63 are formed in vertical stripes to overlap the vertical parts of the first electrodes 62, thereby constituting the power generation portions (solar batteries) 61.

Such an arrangement of the first electrodes 62 in a lattice shape and the power generating semiconductor layer 34 to cover the entire surface thereof can increase the effective area of the power generation portions 61, thereby increasing power generation output.

The reason why the first electrodes 62 are not entirely in a lattice shape as shown in FIG. 17 is that the mutual connection between blocks composed of a plurality of the first electrodes 62 makes it possible to obtain a predetermined voltage or electric current.

Also in this case, the arrangement of an auxiliary light source such as an electro-luminescent light (EL) on the back side of the liquid crystal display panel 9' equipped with the solar battery unit makes it possible to apply light of the auxiliary light source to the visual recognition side through an opening of the solar battery unit, thereby enabling a bright display by turning on the auxiliary light source even when the outside is dark.

Further, the power generating semiconductor layer 34 is disposed in a lattice shape to cover ineffective regions for display around the display electrodes 68, thereby enabling to block light to the ineffective regions for display when the auxiliary light source is turned on, and improving the display quality.

Figure 18:
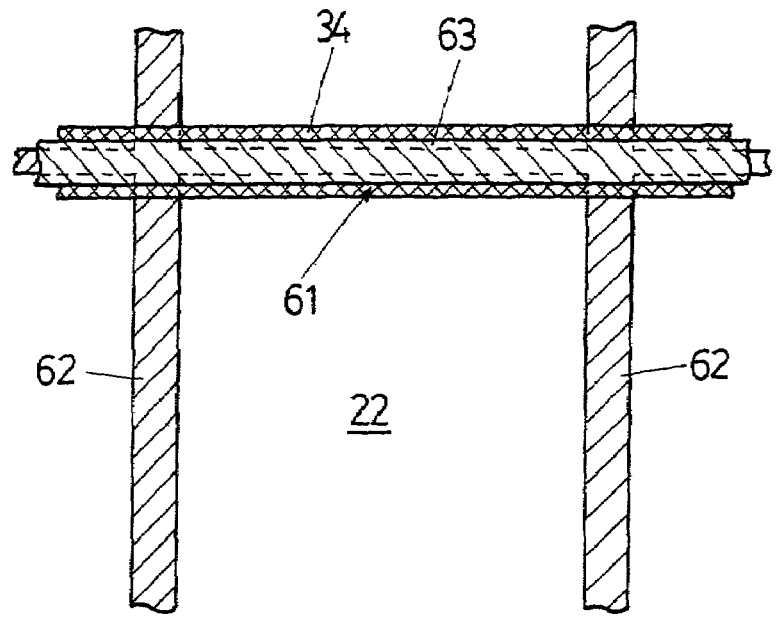
FIG. 18 is a schematic plan view showing a part of a portion constituting a solar battery unit of a seventh structural example of the liquid crystal display device used in the timepiece according to the present invention.
Figure 19:
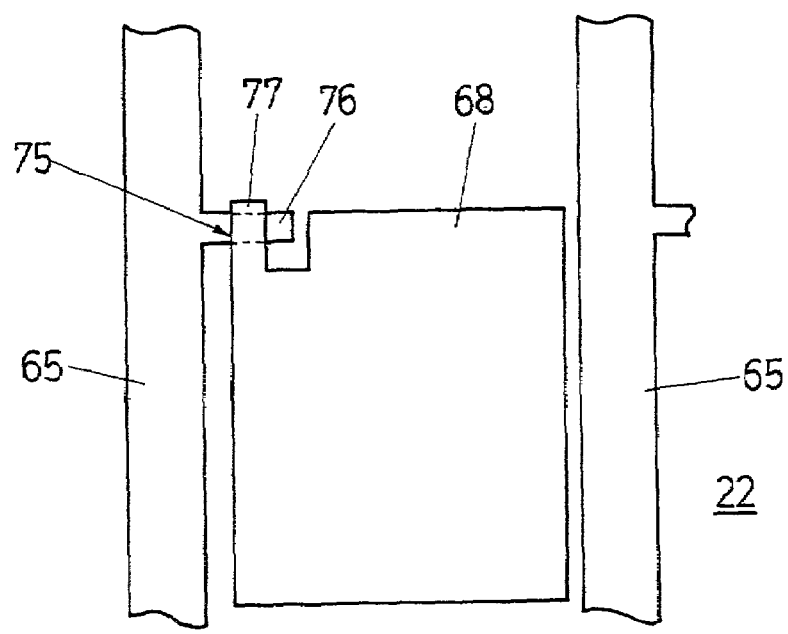
FIG. 19 is a schematic plan view showing electrodes and a thin film diode for one pixel of the liquid crystal display panel in the liquid crystal display device of the same.

Seventh Structural Example of Liquid Crystal Display Device: FIG. 18 and FIG. 19

Next, the seventh structural example of the liquid crystal display device installed in the timepiece according to the present invention is explained with FIG. 18 and FIG. 19. This liquid crystal display device is constituted by installing a solar battery unit into a liquid crystal display panel with thin film diodes (TFD), each of which is a two-terminal type active element as a nonlinear element for switching a signal to a pixel portion, provided on one of substrates (active substrates) sandwiching a liquid crystal layer.

FIG. 18 is a schematic plan view showing a part of a portion constituting the solar battery unit in the liquid crystal display device, and FIG. 19 is a schematic plan view showing electrodes and the thin film diode for one pixel of the liquid crystal display panel, in which a cross section corresponding to the above-described FIG. 16 is the same as FIG. 16 except that there is no scanning electrode 64, and that opposed electrodes 73 are formed in belts at positions facing display electrodes.

In this solar battery unit, first electrodes (lower electrodes) 62 are arranged in a lattice shape on a second substrate 22 of the liquid crystal display panel, power generating semiconductor layers 34 each made of an amorphous silicon (a-Si) film are formed in horizontal stripes on horizontal stripe portions of the first electrodes 62, and further, second electrodes (upper electrodes) 63 are arranged on the power generating semiconductor layers 34.

The above-described arrangement of the first electrodes 62 in a lattice shape and the power generating semiconductor layers 34 in horizontal stripes can increase the effective area of power generation portions 61. The reason why the power generating semiconductor layer 34 is horizontally arranged is that a data electrode (vertical electrode) 65 is connected to the thin film diode 75 shown in FIG. 19. If the thin film diode 75 is connected to a scanning electrode (horizontal electrode), it is desirable to form the power generating semiconductor layer 34 in a vertical stripe in viewpoint of prevention of decrease in efficiency of the solar battery unit due to non-transmission of wiring connected to the thin film diode 75.

A transparent insulating film (not shown) is formed over the entire surface of the second substrate formed with the solar battery unit as described above. Further, the data electrodes 65 each made of a tantalum (Ta) film are arranged in vertical stripes to overlap the vertical stripe portions of the first electrodes 62 of the solar battery unit on the insulating film as shown in FIG. 19, and a display electrode 68 made of an indium tin oxide (ITO) film is arranged between the adjacent data electrodes 65.

A lower electrode 76 is extended from the data electrode 65 toward the display electrode, and a tantalum oxide ($Ta_2O_5$) film (not shown) made by anodizing a tantalum film is formed on the lower electrode 76 as a nonlinear resistance layer. Further, an upper electrode 77 is extended from the display electrode 68 to intersect the lower electrode 76 through the nonlinear resistance layer.

The lower electrode 76, the tantalum oxide film and the upper electrode constitute the thin film diode (TFD) 75.

A predetermined voltage is applied to the data electrode 65 to apply a voltage between the display electrode 68 and an opposed electrode (not shown) which is disposed with the liquid crystal layer interposed therebetween, and thus the liquid crystal layer around the display electrode 68 has no change by signal, an effective display can not be performed there. Therefore, the first electrodes 62 and the second electrodes 63 of the solar battery unit are arranged around the display electrode 68. Further, since the transparent conductive film is used for the opposed electrode, the arrangement of the power generating semiconductor layer 34 in a direction perpendicular to the data electrode 65 makes it possible to supply predetermined light energy to the solar battery unit without influence exerted upon the display performance.

Furthermore, as in the sixth structural example shown in FIG. 16, an auxiliary light source such as an electroluminescent light (EL) is disposed on the opposite side to the visual recognition side of the liquid crystal display panel equipped with the liquid crystal display panel also in this structure, thereby making it possible to apply light emitted by the auxiliary light source to the visual recognition side through the transmission regions of the solar battery unit, whereby even when the outside is dark, a bright display becomes possible by turning on the auxiliary light source.

It should be noted that the first electrodes 62 of the solar battery unit are partially arranged in a lattice shape with parts thereof cut off, and blocks composed of a plurality of the first electrodes 62 are mutually connected, thereby making it possible to obtain a predetermined voltage or electric current also in this structure.

Operation and Effect of Each Structural Example of Liquid Crystal Display Device In each liquid crystal display device having the above-described function of generating electric power installed in the timepiece according to the present invention, solar batteries are arranged on the opposite side to the visual recognition side of the liquid crystal display panel, whereby the whole or a part of energy consumed by its liquid crystal display panel or the liquid crystal display device can be obtained by converting light energy to electric energy by means of the solar batteries.

The use of a reflection color or an absorption color of the solar battery for the display by the liquid crystal display panel can prevent blockage of light to the power generation regions of the solar battery, never decreasing the power generation efficiency of the solar battery.

In order to correct the difference in color tone between the power generation region and the electrode region therearound of the solar battery unit or region where the substrate surface is exposed, the printed layer with an ink of the same color as the color tone of the power generation region is provided outside the power generation region. Thereby, when the solar battery unit is used as the reflection color or the absorption color of the liquid crystal display panel, a reflection surface or an absorption surface is in a uniform color tone, thereby making the liquid crystal display panel into a uniform display color.

When the power generation region of the solar battery unit is used as the display color, it is necessary to apply light to the solar battery unit which is disposed at the back of the liquid crystal display panel without deterioration of the liquid crystal within the power generation region. In other words, light with a wavelength much shorter than that of the visible light is not preferable because ultraviolet light causes deterioration of the liquid crystal layer, and conversely light with a wavelength much longer than that of the visible light causes absorption by the liquid crystal layer.

When the power generation region effectively absorbs the visible light to generate electric power, absorption of the visible light without reflection occurs. Therefore, the use of the solar battery unit for the display of the liquid crystal display panel means the use of the solar battery unit as an absorbing plate. Accordingly, a bright display is required of the liquid crystal display panel to improve the contrast ratio of the liquid crystal display panel.

When the liquid crystal display panel disposed above the solar battery unit performs a display using polarizing films, the use of the reflection-type polarizing film as the polarizing film disposed on the opposite side to the visual recognition side enables utilization of the reflection characteristics and transmission characteristics, presenting a bright reflection display and a dark display through the use of the solar battery unit.

Further, in the liquid crystal display panel using the liquid crystal layer composed of a guest-host liquid crystal that is the mixed liquid crystal composed of a liquid crystal and a dichroic dye, a difference of at least 0.1 or more on a chromaticity diagram (x, y) is given between the absorption color of the dichroic dye and the absorption color of the solar battery unit, thereby enabling recognition.

The liquid crystal display panel using the liquid crystal layer composed of the scattering-type mixed liquid crystal containing a transmitting polymer solid substance in a liquid crystal enables a bright display by virtue of the blocking effect of the solar battery unit and scattering by the mixed liquid crystal. In this case, since the transmittance is large as compared to a display using another liquid crystal layer, the display region can be changed in accordance with a decrease in the power generation efficiency of the solar battery unit due to a decrease in external light or a necessity of charge of energy to the liquid crystal display device, thereby controlling the quantity of application of light to the solar battery unit. The use of a large transmittance enables improvement of the power generation efficiency of the solar battery unit.

Further, the power generation regions and the transmission regions are provided in the same substrate in the solar battery unit, and the transmission regions are matched with the display regions of the liquid crystal display panel, thereby improving both the power generation efficiency and the display quality.

Furthermore, it becomes possible to apply light from the auxiliary light source which is disposed on the back side of the solar battery unit through the use of the opening of the solar battery unit, whereby the liquid crystal display panel can be used as a transmission-type liquid crystal display panel.

The printed layer for shielding the difference in color tone between the power generation region and its surroundings of the solar battery unit can be provided on the solar battery unit. In particular, the provision of the printed layer on the reflection-type polarizing film or on the cholesteric liquid crystal film used for constitution of the liquid crystal display panel is effective in making the display uniform because the surfaces of them are flat as compared to the surface of the solar battery unit and bonding it to the liquid crystal display panel causes no distortion.

The liquid crystal display device having such a function of generating electric power is suitable for a display device of an electronic desk calculator or a portable information instrument. Further, the liquid crystal display device is applied to a timepiece that has a severe limitation of power consumption, in which the printed layer brings the colors of the electrode portion of the solar battery and its power generating semiconductor layer into the same color tone. This is extremely effective in the timepiece for which decoration is important.

The combination of the printed layer and the color film can make the solar battery unobtrusive to a user of the device. Further, the liquid crystal display device equipped with the solar battery unit in which the solar batteries (power generation portions) are arranged in a matrix or in stripes to provide the transmission portions is used for a timepiece, thereby making it possible to use a surface emission-type auxiliary light source such as an EL, enabling a bright display by turning on the auxiliary light source even in a dark environment and making the timepiece thinner.

Second Embodiment of Timepiece: FIG. 20 to FIG. 28

Next, the second embodiment of the timepiece according to the present invention is explained with reference to FIG. 20 to FIG. 28 of the drawings.

A liquid crystal display device installed in a timepiece described below is, different from the liquid crystal display devices installed in the timepiece of the first embodiment which have been explained hereinbefore, structured so that a solar battery unit having transmission portions and power generation portions is disposed on the visual recognition side of the liquid crystal display panel so as to recognize a display by the liquid crystal display panel through the transmission portions.

Figure 20:
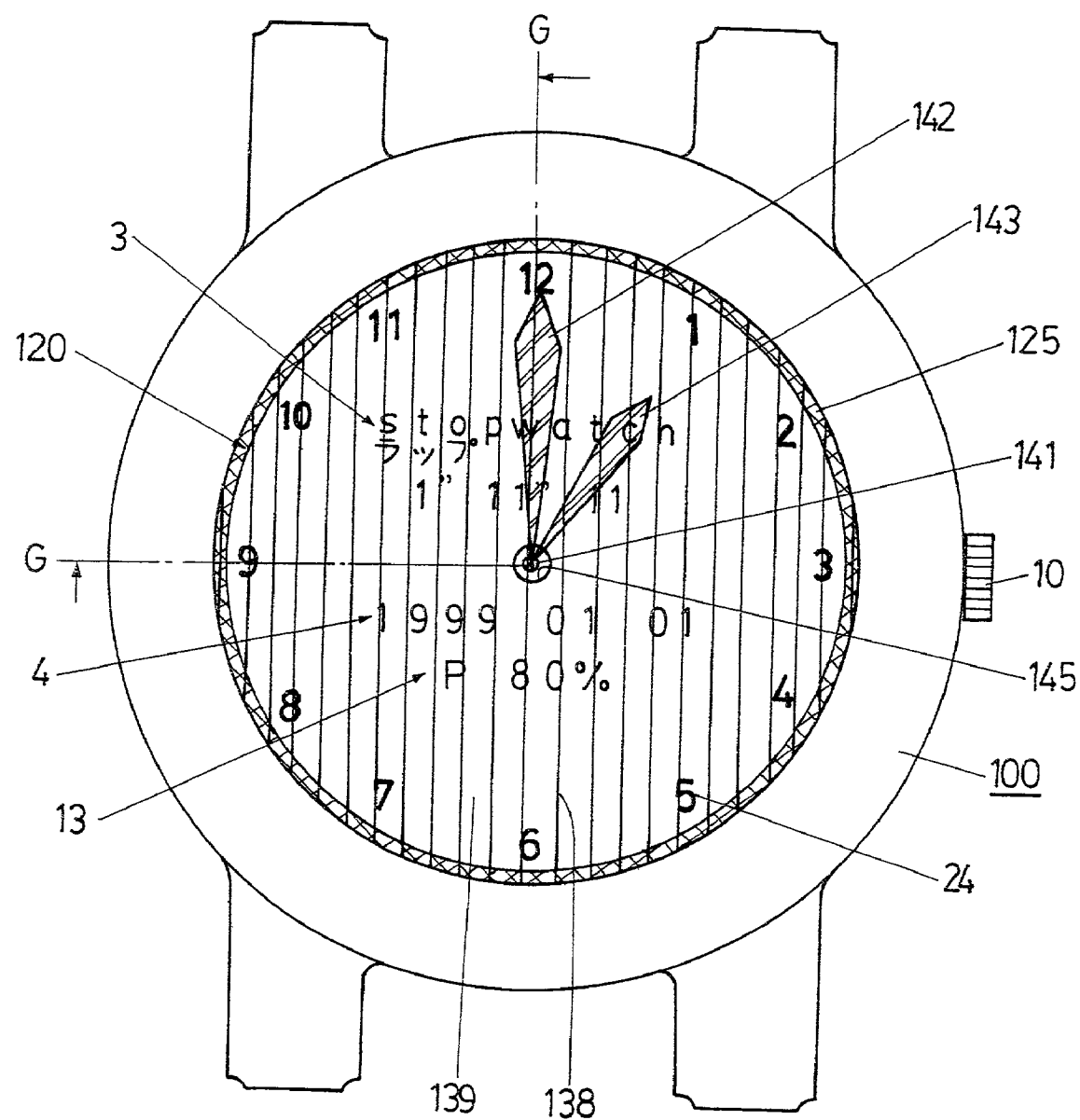
FIG. 20 is a schematic plan view showing a second embodiment of the timepiece according to the present invention.

FIG. 20 is a schematic plan view of a wristwatch equipped with the liquid crystal display device having the function of generating electric power, and FIG. 21 is a schematic cross-sectional view taken along a line XXI—XXI in FIG. 20. FIG. 22 is a schematic plan view of only the solar battery unit.

This watch is, as shown in FIG. 20, a combination watch using both an analog display in which time is indicated by an hour hand 143 and a minute hand 142 mounted on a hand shaft 141, and a digital display by the liquid crystal display panel.

A circular solar battery unit 120 is disposed at a position corresponding to a dial on which hour figures 24 for indicating hours at the front face of a watch case 100, and the hour hand 143, the minute hand 142 and a liquid crystal display panel 90 described below are arranged thereunder.

The solar battery unit 120 is formed such that power generation portions 138 for absorbing light to generate electric power and transmission portions 139 for transmitting light are alternately formed in vertical stripes almost over the entire surface thereof. The pitches of the power generation portions 138 are made larger near the center in the horizontal direction in FIG. 20 to increase an area proportion of the transmission portions 139, thereby making a display by the liquid crystal display panel legible. The pitches of the power generation portions 138 are conversely made smaller near both ends to decrease the area proportion of the transmission portions 139, thereby increasing the power generation efficiency.

Further, a through hole (hand shaft hole) 145 into which the hand shaft 141 is inserted is provided at the center. A mode adjusting button 10 is provided at the side face of the watch case 100.

The liquid crystal display panel 90 under the solar battery unit 120 is provided with a chronograph display portion 3, a year-month-date display portion 4 and a battery remaining capacity display portion 13.

The solar battery unit 120 and the liquid crystal display panel 90 are explained here in detail with reference to FIG. 22 to FIG. 28.

Figure 23:
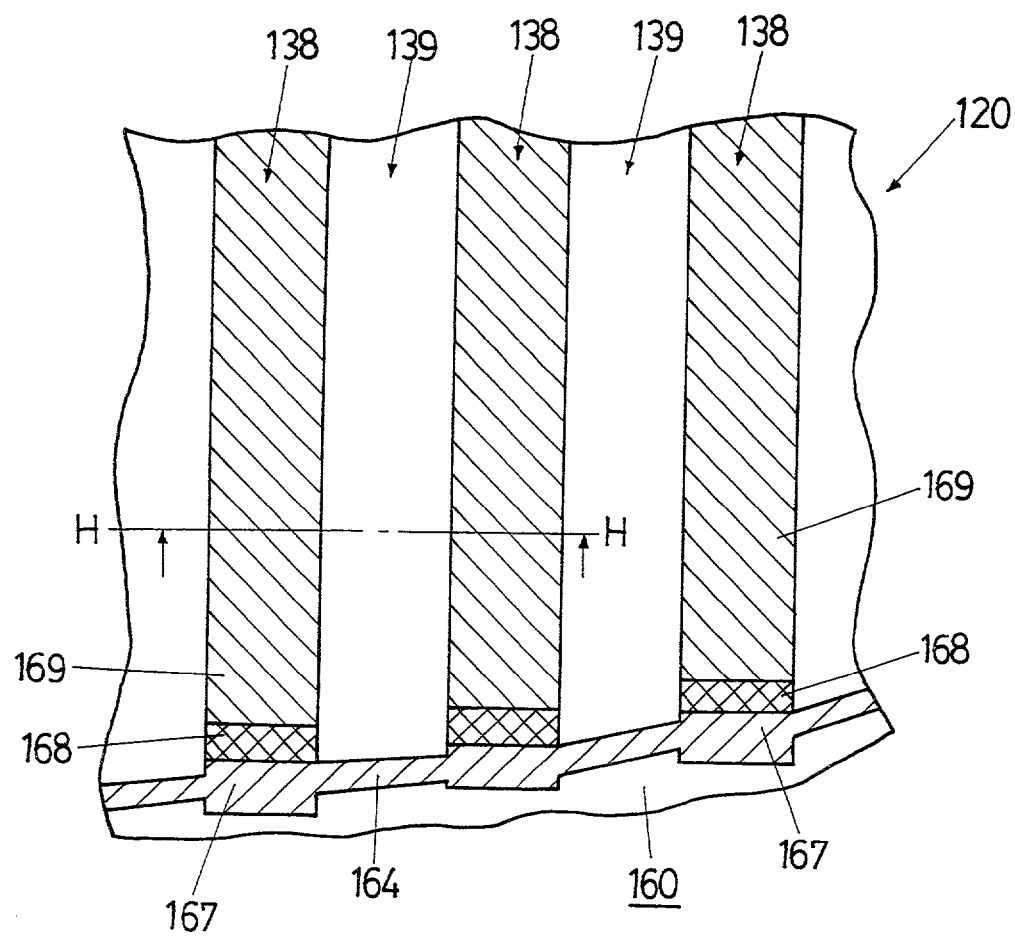
FIG. 23 is a partially enlarged view showing a part near a second electrode connecting portion 164 of the solar battery unit shown in FIG. 22.
Figure 27:
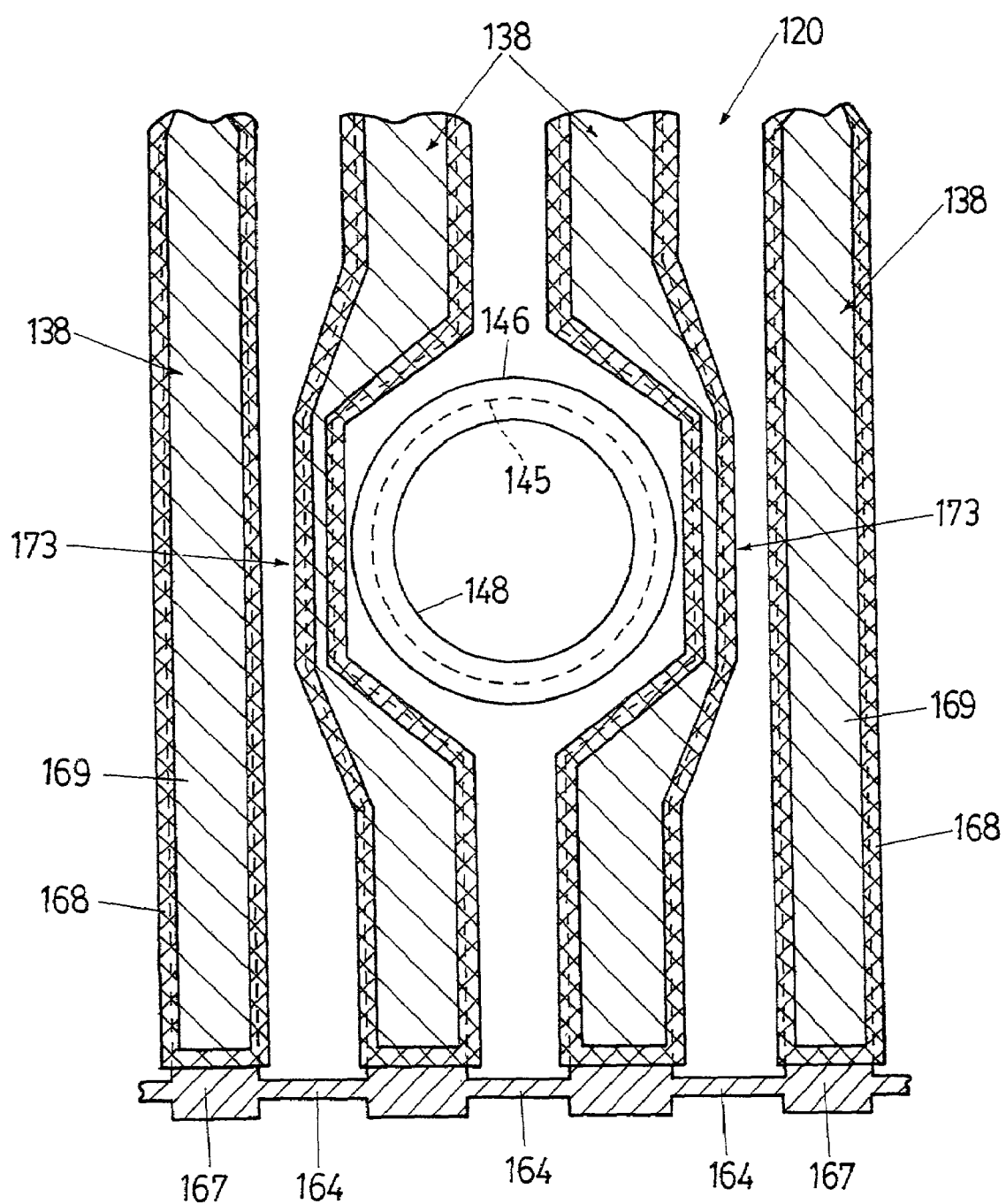
FIG. 27 is a schematic plan view enlarging and showing another structural example of the power generation portion at the central portion of the solar battery unit.
Figure 28:
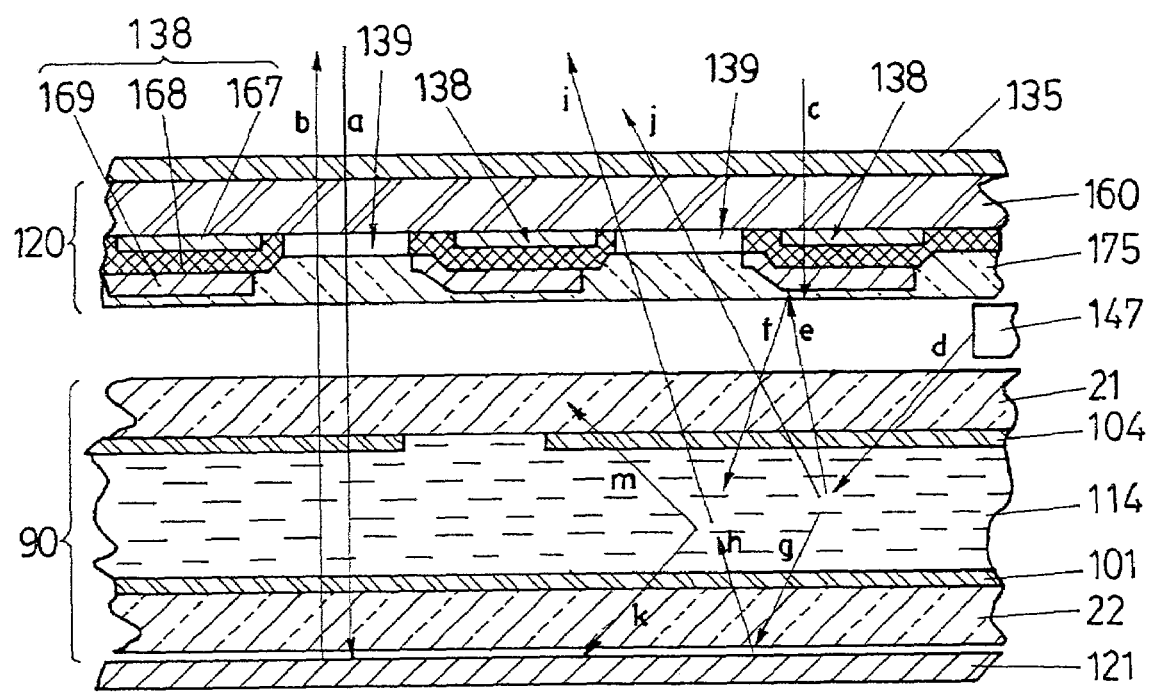
FIG. 28 is a cross-sectional view enlarging and showing a part of the liquid crystal display device constituted by the liquid crystal display panel 90 and the solar battery unit 120 shown in FIG. 21.

FIG. 22 is a schematic plan view of only the solar battery unit. FIG. 23 is a partially enlarged view enlarging and showing a part near a second electrode connecting portion 164, and FIG. 24 is a schematic cross-sectional view taken along a line XXIV—XXIV in FIG. 23. FIG. 25 is a schematic plan view enlarging and showing the central portion of the solar battery unit shown in FIG. 22. FIG. 26A, FIG. 26B and FIG. 26C are schematic plan views separately showing the second electrode, the semiconductor layer and the first electrode of the solar battery unit shown in FIG. 25, respectively. FIG. 27 is a plan view similar to FIG. 25, showing another form example of the power generation portions at the central portion of the solar battery unit. FIG. 28 is a cross-sectional view enlarging and showing a part of the liquid crystal display device constituted of the liquid crystal display panel 90 and the solar battery unit 120 shown in FIG. 21.

In the liquid crystal display panel 90, as shown in FIG. 21 and FIG. 28, first and second transparent substrates 21 and 22 are bonded together with a predetermined gap interposed therebetween with spacers (not shown) and a sealing portion 115, and a liquid crystal layer 114 is filled into the gap and sealed with a closing material (not shown). Through holes, into which the hand shaft 141 is inserted, are formed respectively at centers of the first substrate 21 and the second substrate 22, and the peripheries thereof are also sealed with the sealing portion 115.

A large number of signal electrodes 101 each made of a transparent conductive film are formed in stripes in a direction parallel to the paper surface on the inner surface of the second substrate 22. On the inner surface of the first substrate 21 opposed to the aforesaid inner surface of the second substrate 22 with the predetermined gap interposed therebetween, a large number of opposed electrodes 104 each made of a transparent conductive film are formed in stripes in a direction perpendicular to the paper surface. Portions where the signal electrodes 101 intersect and overlap the opposed electrodes 104 form pixel portions.

For the liquid crystal layer 114, a mixed liquid crystal layer is used, which contains a transparent solid substance made by injecting a host in which organic monomers are dispersed in a liquid crystal and thereafter applying ultraviolet light thereto to thereby polymerize them into organic polymers. As the liquid crystal layer 114, PNM-157 manufactured by Dainippon Ink and Chemicals, Inc. is used and filled in an environment at a temperature of 20° C. or more, and thereafter ultraviolet light of 365 nanometers (nm) is applied thereto at a strength of 30 mW for 60 seconds in an atmosphere at 19.5° C., thereby producing the mixed liquid crystal layer composed of the liquid crystal and the transparent solid substance.

The mixed liquid crystal layer 114 is in a scattering state when no voltage is applied to the pixel portions because of a great difference in refractive index between the liquid crystal and the transparent solid substance, and is brought into a transparent state because the difference in refractive index between the liquid crystal and the transparent solid substance decreases by applying voltage.

Under the second substrate 22, a reflector 121 is disposed, which is made by forming an anodic oxide film on an aluminum substrate and further forming a transparent protection film by evaporating an aluminum (Al) film. This reflector 121 does not transmit light, giving priority to reflectance. Further, a through hole into which the hand shaft 141 is inserted is also formed at the center of the reflector 121 as shown in FIG. 21.

Next, the structure of the solar battery unit 120 is explained with reference to FIG. 22 to FIG. 28.

Figure 24:
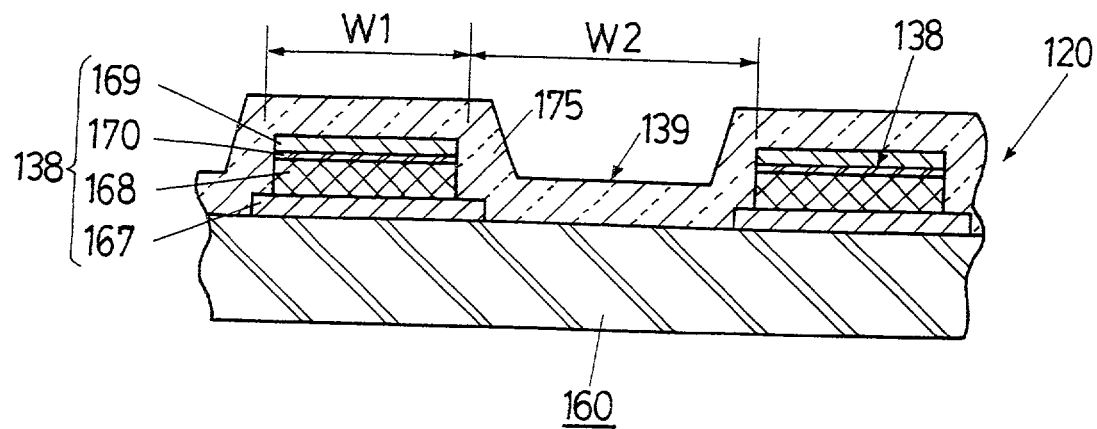
FIG. 24 is a schematic cross-sectional view taken along a line XXIV—XXIV in FIG. 23.
Figure 25:
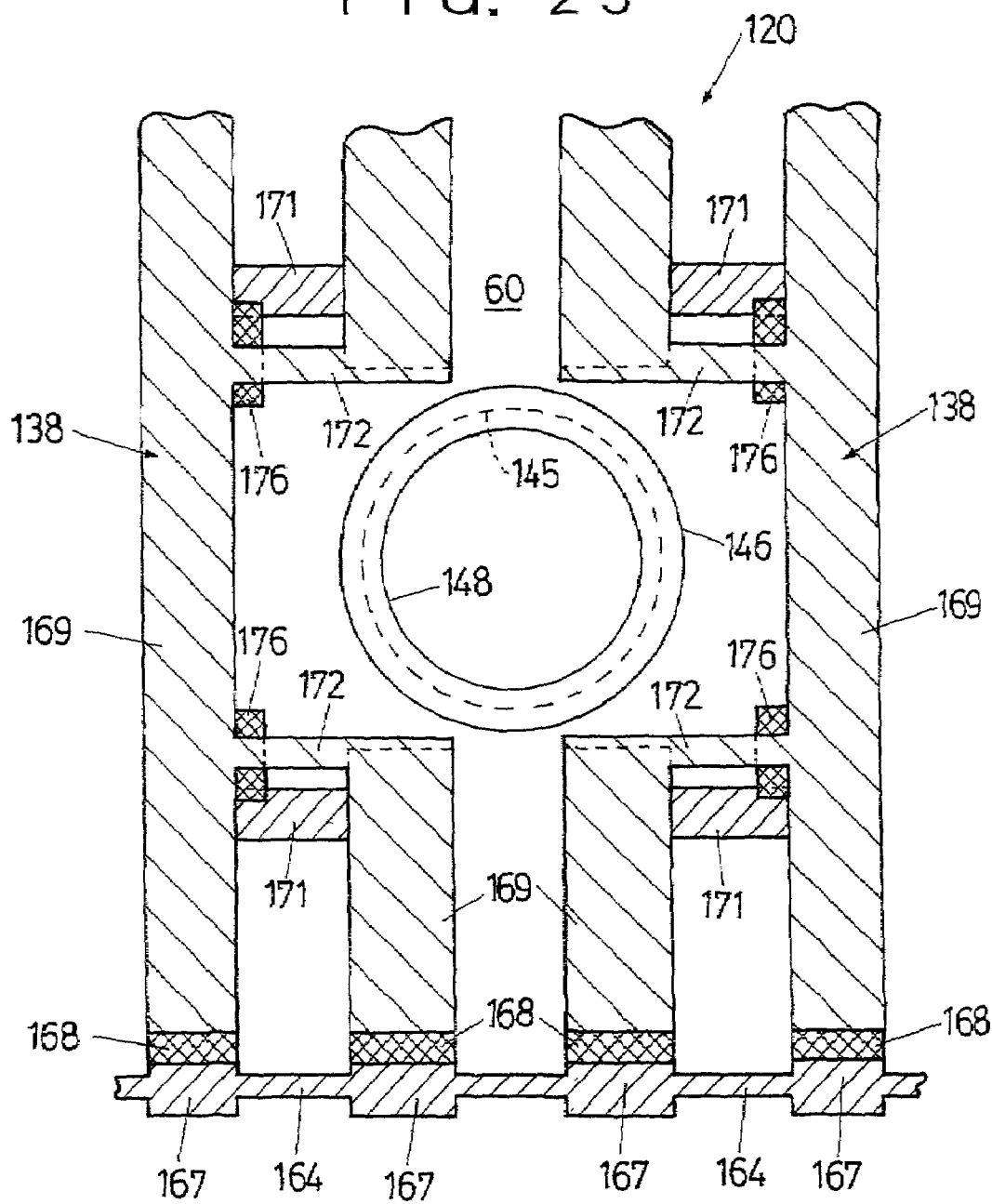
FIG. 25 is a schematic plan view enlarging and showing a central portion of the solar battery unit shown in FIG. 22.

In the solar battery unit 120, as clearly shown in FIG. 22 to FIG. 24, first electrodes (lower electrodes) 167 each made of an indium tin oxide (ITO) film which is a transparent conductive film are formed on a solar battery substrate 160 made of a glass substrate, power generating semiconductor layers 168 each having a PIN junction or a PN junction and made of an amorphous silicon (a-Si) film, and buffer layers 170 (see FIG. 24) for preventing mutual diffusion are provided to overlap the first electrodes 167, and further, second electrodes (upper electrodes) 169 each made of an indium tin oxide (ITO) film are provided to overlap the buffer layers 170, thereby constituting the power generation portions in vertical stripes.

A large number of the power generation portions 138 are formed parallel to each other with spaced intervals therebetween as shown in FIG. 22 and FIG. 23. Portions where no power generation portions 138 are provided on the solar battery substrate 160 are transmission portions 139 for transmitting light. This results in that the power generation portions 138 and the transmission portions 139 are alternately provided.

As shown in FIG. 24, widths of the second electrode 169, the buffer layer 170 and the power generating semiconductor layer 168 in the power generation portion 138 are the same as that of a width W1 of the power generation portion 138 and are made considerably smaller than a width W2 of the transmission portion 139 between the power generation portions 138. The widths of the power generation portion 138 and the transmission portion 139 are not so different in FIG. 23 to FIG. 28 for convenience of illustration, but the width W2 of the transmission portion 139 is actually far larger than the width W1 of the power generation portion 138.

For example, the width W1 of the power generation portion 138 is made 20 micrometers (μm), and the width W2 of the transmission portion 139 is made 180 micrometers (μm). This brings an area proportion occupied by the power generation portions 138 (proportion of the power generation portions) on the solar battery substrate 160 to about 10%.

The watch requires low power consumption, and thus even the area proportion occupied by the power generation portions 138 of about 10% enables effective power generation.

Further, as shown in FIG. 24 and FIG. 28, a protection layer 175 made of a polyimide resin is provided over the entire surface to prevent deterioration of the power generation portions 138 due to humidity.

The protection layer 175 is disposed on the first substrate 21 side of the liquid crystal display panel 90, and the solar battery substrate 160 is disposed on the visual recognition side as shown in FIG. 28 in an actual watch.

An ultraviolet light cut layer 135 made of an acrylic resin adhesive layer containing titanium oxide (TiO) as an ultraviolet light reflecting material and a polyethylene terephthalate (PET) film is provided on the visual recognition side (upper side) of the solar battery unit 120. This ultraviolet light cut layer 135 has a transmittance of 1% to 3% within a short wavelength region less than 380 nanometers (nm) and a transmittance of 50% at a wavelength of 400 nanometers (nm), and a transmittance of about 90% at a wavelength longer than 420 nanometers (nm).

The solar battery unit 120 constituted by the above-described structures, the liquid crystal display panel 90 and the like constitute the liquid crystal display device having the function of generating electric power, in which the ultraviolet light cut layer 135, the solar battery unit 120, the first substrate 21 and the second substrate 22 of the liquid crystal display panel 90, and the reflector 121 are arranged, from the upper side near a cover glass 102, in a watch case 100 as shown in FIG. 21. Further, any of them is formed with a through hole through which the hand shaft 141, protruding from a hand shaft drive portion 131 disposed under the reflector 121 and vertically extending, passes.

A minute hand shaft and an hour hand shaft are coaxial on the hand shaft 141 which is inserted into the above-described through holes to protrude into a space between the cover glass 102 and the solar battery unit 120. The minute hand 142 and the hour hand 143 (see FIG. 20) are joined to the tip portions of the minute hand shaft and the hour hand shaft respectively. A second hand shaft may be provided in the center of the hand shaft 141 so that a second hand may be joined to the tip portion thereof.

A circuit board 132 is disposed under the hand shaft drive portion 131. The circuit board 132 is formed with circuits for applying predetermined signals to the liquid crystal display panel 90, the hand shaft drive portion 131 and an upper auxiliary light source 147 described below, and further, a secondary battery 133 for accumulating generated energy from the solar battery unit 120 is mounted thereon.

Further, the upper auxiliary light source 147 composed of an electro-luminescent (EL) element is provided at the outer peripheral portion between the solar battery unit 120 and the liquid crystal display panel 90 inside this watch. This electro-luminescent (EL) element has a light emitting surface on the first substrate 21 side of the liquid crystal display panel 90, thus forming a structure in which the polyethylene terephthalate (PET) film, a front surface electrode made of a transparent conductive film, a light emitting layer, a dielectric layer and a rear surface electrode made of carbon are laminated in order from the first substrate 21 side.

The emitted light from the upper auxiliary light source 147 passes through the first substrate 21 and is repeatedly reflected and refracted by the liquid crystal layer 114 having a scattering property and the reflector 121, and further guided toward the center (the through hole 145) of the liquid crystal display panel 90 by reflection of the second electrode 169 of the solar battery unit 120.

The structure of protecting the through hole 145 in the solar battery unit 120 and connecting means of the large number of power generation portions 138 are explained here.

As shown in FIG. 22, the solar battery unit 120 has the through hole 145 at the center of the solar battery substrate 160, and a resin portion 146 having a resin portion hole 148 is provided at the through hole 145 to prevent breakage of the solar battery substrate 160. Further, a notch portion 156 for positioning is provided at the top of the solar battery substrate 160.

A second electrode connecting portion 162 in an arc shape is provided at the upper end in FIG. 22 of the number of the power generation portions 138 in vertical stripes, and a second electrode pad portion 161 is provided at one end thereof. Further, a first electrode connecting portion 164 in an arc shape is provided at the lower end of the power generation portions 138, and a first electrode pad portion 163 is provided at one end thereof.

In the power generation portions 138, first electrodes 167 extend longest at the lower ends as shown in FIG. 23, and all of them are connected with the first electrode connecting portion 164 and connected to the first electrode pad portion 163.

Although the upper ends of the power generation portions 138 are not shown, second electrodes 169 extend longest, and all of them are connected with the second electrode connecting portion 162 and connected to the second electrode pad portion 161.

However, at the portion where the through hole 145 is provided in the solar battery substrate 160, since the power generation portion 138 is parted, the first electrode 167 is connected to an adjacent first electrode 167 through first electrode detouring portions 171 as shown in FIG. 25 and FIG. 26A to FIG. 26C. Further, the power generating semiconductor layer 168 is provided with projecting portions 176 projecting into the first electrode detouring portions 171 to prevent an electrical short circuit between the first electrode 167 and the second electrode 169.

On the other hand, the second electrode 169 is connected to an adjacent second electrode 169 through second electrode detouring portions 172. The projecting portions 176 of the power generating semiconductor layer 168 also projecting into the second electrode detouring portions 172.

As described above, the first electrode 167 and the second electrode 169 near the through hole 145 are mutually connected with the adjacent first electrode 167 and the adjacent second electrode 169 through the detouring portions 171 and 172 respectively.

FIG. 26C shows the through hole 145 formed near the center on the solar battery substrate 160 and the resin portion 146 which is formed at the through hole 145, and a state in which the first electrodes and the first electrode detouring portions 171 constituting the power generation portions 138 are formed. The power generating semiconductor layers 168 having the projecting portions 176 shown in FIG. 26B are formed overlapped on the first electrodes 167 shown in FIG. 26C. Further, the second electrodes having the second electrode detouring portions 172 shown in FIG. 26A are formed overlapped on the power generating semiconductor layers 168.

FIG. 27 is a view showing another structural example for the power generation portions 138 to detour the through hole 145 and the resin portion 146 of the solar battery substrate 160. It is also possible that portions of the power generation portions 138 near the center which interfere with the resin portion 146 are made thinner in width and are bent outward to an extent at which they do not touch the adjacent power generation portions, thereby forming detouring portions 173 which detour the resin portion 146 as in the drawing. The power generation portions 138 are thus provided also at the central portion where the through hole 145 exists, so that the first electrode 167 and the second electrode 169 can be connected to other identical electrodes respectively.

Further, the first electrode pad portion 163 and the second electrode pad portion 161 shown in FIG. 22 provided at the solar battery unit 120 are connected to the circuit board 132 through a solar battery unit connecting portion 158 and a connecting unit 159 composed of a flexible print circuit board (FPC) shown in FIG. 21. The connection is established by crimp using anisotropic conductive paste in this embodiment.

As shown in the same FIG. 21, the front surface electrode and the rear surface electrode of the upper auxiliary light source 147 are also electrically connected using the same connecting unit 159 composed of FPC and an upper auxiliary light source connecting portion 157. The electrode pad portions 161 and 163 of the solar battery unit 120 and the electrodes of the upper auxiliary light source 147 are located to face each other, so that a press of the solar battery unit 120 and the upper auxiliary light source 147 against each other establishes an electric connection thereof to the connecting unit 159. Further, the use of the same FPC facilitates the connection to the circuit board 132.

Further, a panel holder 126 is provided to hold the liquid crystal display panel 90, and zebra rubber connectors 127, in which conductive portions and insulating portions are laminated in stripes, connects the liquid crystal display panel 90 and the circuit board 132. Thus, it becomes possible to mount a timepiece module constituted of the liquid crystal display panel 120, the hand shaft drive portion 131, the circuit board 132 and the like.

Further, a panel cover 125 is provided at the back side of the cover glass 102 in order to shield the panel holder 126 of the timepiece module and to improve visual design.

This timepiece module is inserted into the watch case 100, the cover glass 102 and a case back 103, thereby completing a wristwatch.

The directions of light when an external light source (not shown) and the upper auxiliary light source 147 are in use are explained here with FIG. 28. A first incident light c from the external light source is made incident on the power generation portion 138 and used for optical power generation. A second incident light a is brought into a reflected light b by the reflector 121 and goes out to the visual recognition side while the liquid crystal layer 114 is in a transmission state, thereby allowing an observer to recognize the state of the reflector 121.

While the liquid crystal layer 114 is in a scattering state, the second incident light a does not show the mirror state of the reflector 121 but is brought into a scattering light. In other words, a contrast ratio is obtained by a mirror property in the transmission state and a scattering property in the scattering state. Accordingly, the quantity of light reaching the visual recognition side is large even in the scattering state, thereby achieving a bright display.

Alternatively, while the liquid crystal layer 114 is in the scattering state, the scattering light is made incident on the power generation portion 138 of the solar battery unit 120 from the side wall side thereof, increasing the quantity of power generation.

On the other hand, an incident light d from the upper auxiliary light source 147 when the upper auxiliary light source 147 is turned on becomes a component on the solar battery substrate 160 side as a first scattering light e and a second outgoing light j, and a component on the reflector 121 side as a third scattering light g. The first scattering light e is reflected by the second electrode 169 of the power generation portion 138 on the solar battery substrate 160 and is made incident again on the liquid crystal layer 114 as a second scattering light f.

The second outgoing light j goes out to the visual recognition side through the transmission portion 139 of the solar battery substrate 160. The third scattering light g is reflected by the reflector 121 to become a fourth scattering light h, and is scattered by the liquid crystal layer 114 to become a first outgoing light i, a fifth scattering light k and a sixth scattering light m.

The reflection by the power generation portion 138, the reflection by the reflector 121 and the transmission and scattering by the liquid crystal layer 114 are similarly repeated, the emitted light from the upper auxiliary light source 147 which is provided around the display region of the liquid crystal display panel 90 is guided into the display region. Further, the outgoing light can present information to the observer.

According to this embodiment, the provision of the ultraviolet light cut layer 135 on the upper side of the solar battery unit 120 can prevent excessive energy from being made incident on the power generation portion 138 and additionally light with a short wavelength (ultraviolet light) having a high energy from being made incident on the liquid crystal layer 114 of the liquid crystal display panel 90.

The watch including this solar battery unit can be used for a long time without replacement of batteries, realizing a maintenance-free watch.

Further, the solar battery unit 120 and the upper auxiliary light source 147 are connected to the circuit board 132, with their electrodes arranged facing each other, using the same FPC (connecting unit) 159, thereby both stabilizing their connection and reducing the connection space by crimping and holding by means of the panel holder 126.

Further, the provision of the upper auxiliary light source 147 between the solar battery unit 120 and the first substrate 21 of the liquid crystal display panel 90, and further the use of the mixed liquid crystal layer composed of the liquid crystal and the transparent solid substance for the liquid crystal layer 114, and the provision of the reflector 121 under the liquid crystal display panel 90 can guide the emitted light from the upper auxiliary light source 147 to the central portion of the display region of the liquid crystal display panel 90.

The provision of the resin portion 146 at the through hole 145 provided in the solar battery unit 120 and the periphery thereof can prevent distortion and breakage of the solar battery substrate 160 due to the through hole 145. Further, the resin portion 146 can prevent breakage of the solar battery unit 120 when an impact exerted on the watch.

The width of the power generation portion 138 provided in the solar battery unit 120 is made small as compared to the transmission portion 139, thereby making it possible to clearly recognize the display on the liquid crystal display panel 90 through the transmission portion 139.

Furthermore, the second electrode 169 and the first electrode 167 of the power generation portion 138 of the solar battery unit 120 are both made of transparent conductive films, thereby improving the transmission property and increasing the power generation efficiency using diffusing reflection from the liquid crystal display panel 90.

In the solar battery unit 120 as shown in FIG. 27, it is also possible that the power generating semiconductor layer 168 of the power generation portion 138 is a semiconductor layer including a PIN junction or a PN junction made of a amorphous silicon (a-Si) film, on which an aluminum (Al) film which is a metal film having a reflection property is formed as the second electrode 169 through a buffer for preventing mutual diffusion.

For easy recognition of the arrangement of the lower electrode 167, the semiconductor layer 168 and the second electrode 169, the semiconductor layer 168 is wider than the first electrode 167, and the second electrode 169 is narrower than the first electrode 167 in width dimension in FIG. 27, but they may actually have the same width. For example, the width of the power generation portion 138 is made 10 micrometers (μm), and the width of the transmission portion 139 is made 50 micrometers (μm), thereby bringing the proportion of an area occupied by the power generation portions 138 (the proportion of the power generation portions) on the solar battery substrate 160 to about 20%.

Further, when the through hole 145 is sufficiently larger than the pitches of the stripes of the power generation portions 138 and the transmission portions 139, the detouring portions 173 can be provided in a plurality of the power generation portions 138 around the through hole 145 to detour the through hole 145 with the pitches made smaller, thereby making the power generation portions 138 in pseudo stripes. When the width of the transmission portion 139 is not enough for the formation of the detouring portions 173, it is preferable to provide the detouring portions 173 in a plurality of the power generation portions 138 on either side of the through hole 145.

Figure 29:
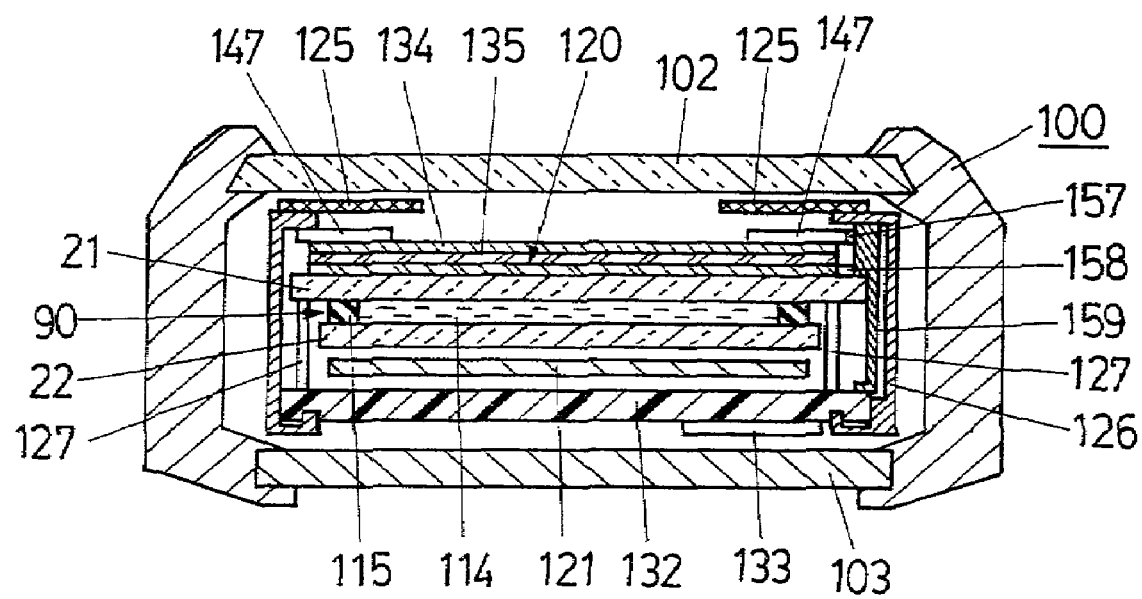
FIG. 29 is a cross-sectional view similar to FIG. 21, showing a third embodiment of the timepiece according to the present invention.

Third Embodiment of Timepiece: FIG. 29

Next, the third embodiment of the timepiece according to the present invention is explained with FIG. 29.

FIG. 29 is a cross-sectional view, similar to FIG. 21, showing the third embodiment of the timepiece according to the present invention, in which the same numerals are given to portions corresponding to those in FIG. 21 and the description thereof is omitted.

The third embodiment is characterized in that an ultraviolet light cut layer 135 and a light wavelength conversion layer 134 are provided on the visual recognition side of a solar battery unit 120 and an upper auxiliary light source 147 is provided above the ultraviolet light cut layer 135. Further, each timepiece of embodiments after the third embodiment is a timepiece by a digital display by means of a liquid crystal display panel.

In the third embodiment, the width of the power generation portion of the solar battery unit 120 is made 50 micrometers (μm), and the width of the transmission portion is made 100 micrometers (μm), whereby the proportion of an area occupied by the power generation portions (the proportion of the power generation portions) on the solar battery substrate is made about 30%. The power generation efficiency of the power generation portion is poor because a plastic substrate is used for the solar battery substrate, and thus the proportion is made about 30%.

An ultraviolet light cut layer 135 which absorbs light with a wavelength of 300 nanometers (nm) to 400 nanometers (nm), constituted of a polyethylene terephthalate (PET) film absorbing light with a wavelength shorter than a range of 300 nanometers (nm) to 320 nanometers (nm) and an adhesive layer, is provided on the visual recognition side (upper side in the drawing) of the solar battery unit 120.

Further, the light wavelength conversion layer 134 which emits light with a wavelength ranging from 400 nanometers (nm) to 800 nanometers (nm) when making a transition into a ground state after an energy state being excited by light with a wavelength of 300 nanometers (nm) to 380 nanometers (nm), is provided on the ultraviolet light cut layer 135. The light wavelength conversion layer 134 contains a rare earth oxide in a glass material.

The emission is of a specific wavelength range within a wavelength range of 400 nanometers (nm) to 800 nanometers (nm). For example, ultraviolet light is absorbed and green light or red light is emitted.

The light wavelength conversion layer 134 can convert light with a short wavelength (ultraviolet light) which deteriorates a power generation layer of the solar battery unit 120 to light with a wavelength effective in power generation of the solar battery unit 120.

Further, the light with a short wavelength can be blocked by the ultraviolet light cut layer 135, thereby preventing deterioration of the solar battery unit 120 and deterioration of a liquid crystal layer 114, and further preventing deterioration of the plastic substrate constituting the solar battery unit 120 or deterioration of a resin which bonds a first substrate 21 of a liquid crystal display panel 90 and the solar battery unit 120.

The solar battery unit 120 is connected to a circuit board 132 by means of a connecting unit 159 composed of an FPC through a solar battery unit connecting portion 158. A terminal of the FPC is inserted between the solar battery unit 120 and the first substrate 21 of the liquid crystal display panel 90, and reinforced with an adhesive containing diffused conductive particles, a resin bonding the solar battery unit 120 and the first substrate 21 and further with the ultraviolet light cut layer 135 and the light wavelength conversion layer 134, thereby enabling to secure an electric connection.

Furthermore, an upper auxiliary light source 147 composed of an electro-luminescent (EL) element is provided at the outer peripheral portion on the upper side of the light wavelength conversion layer 134. Since the upper auxiliary light source 147 is provided with its light emitting surface directed to the liquid crystal display panel 90 side, its electrodes exist at its upper side, enabling an electric connection of the terminal of the connecting unit 159 composed of the FPC thereto with the adhesive containing diffused conductive particles and by pressing by a panel holder 126.

As is clear from the above explanation, the provision of the ultraviolet light cut layer 135 on the upper side of the solar battery unit 120 can prevent excessive energy from being made incident on the power generation portion and light with a short wavelength (ultraviolet light) having a high energy from being made incident on the liquid crystal layer 114 of the liquid crystal display panel 90.

The conversion of light with a wavelength which adversely affects the solar battery unit to light with a wavelength contributing to power generation by means of the light wavelength conversion layer 134 can improve the power generation efficiency of the solar battery unit 120.

Moreover, ultraviolet light of the upper auxiliary light source 147 can be converted in wavelength and applied to the liquid crystal display panel as visible light. Furthermore, the light of the upper auxiliary light source 147 can be converted in wavelength and guided.

When a plastic substrate is used as the substrate of the solar battery unit 120, the solar battery substrate can be held by the ultraviolet light cut layer 135, the light wavelength conversion layer 134 and the first substrate 21 of the liquid crystal display panel 90, thereby preventing distortion and the like of the solar battery unit 120.

The widths of the power generation portions constituting the solar battery unit are made smaller than those of the transmission portions, and the widths of the power generation portions are made smaller than 100 micrometers ($\mu$m), thereby decreasing recognition of the power generation portions and avoiding interference with recognition of the display on the liquid crystal display panel through the transmission portions of the solar battery unit.

Figure 30:
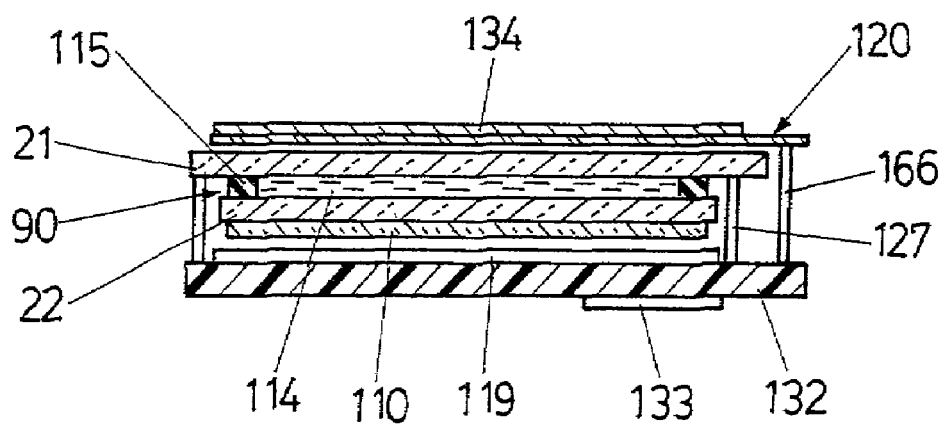
FIG. 30 is a cross-sectional view similar to FIG. 21, showing only an inner module of a fourth embodiment of the timepiece according to the present invention.

Fourth Embodiment of Timepiece: FIG. 30

Next, the fourth embodiment of the timepiece according to the present invention is explained with FIG. 30.

FIG. 30 is a cross-sectional view similar to FIG. 21, showing only an inner module of the fourth embodiment of the timepiece according to the present invention, in which the same numerals are given to components corresponding to those in FIG. 21 and FIG. 29, and the description thereof is omitted.

The fourth embodiment is characterized in that only a light wavelength conversion layer 134 is provided on the upper side of a solar battery unit 120, and that a zebra rubber connector 166 is used for a connection between the solar battery unit 120 and a circuit board 132 similarly to a connection between a liquid crystal display panel 90 and the circuit board 132.

Further, a reflection-type polarizing film 110, of which one polarizing optical axis is a transmission axis and a polarizing optical axis substantially perpendicular thereto is a reflection axis, is bonded to the lower side of a second substrate 22 of the liquid crystal display panel 90 with an acrylic adhesive.

The reflection-type polarizing film 110 has a laminated structure constituted of several-hundred layers of polymers and co-polymers, in which a difference in refractive index is generated in an axis by uniaxially stretching them, and the difference in the refractive index depending on wavelength generates polarization in transmission and reflection. Alternatively, a multi-layer structure composed of liquid crystal and polymer can be employed. A polarizing film with a trade name of DBEF (manufactured by Sumitomo 3M Ltd.) is used in this embodiment.

A lower auxiliary light source 119 is provided below the reflection-type polarizing film 110. As the lower auxiliary light source 119, an electro-luminescent (EL) element is employed when importance is attached to a thin profile. Other than that, a light emitting diode (LED) device, a miniature bulb, a fluorescent tube can be used therefor.

Further, the solar battery unit 120 and the light wavelength conversion layer 134 are provided above the first substrate 21 of the liquid crystal display panel 90. Electric connection between the liquid crystal display panel 90 and the circuit board 132 is established through zebra rubber connectors 127 in which conductive portions and insulating portions are laminated in stripes.

The zebra rubber connector 166 is used for the connection between the solar battery unit 120 and the circuit board 132. The zebra rubber connector 166 for the solar battery unit is longer than the zebra rubber connectors 127 for the liquid crystal display panel and connects with the solar battery unit 120 passing by a side wall of the first substrate 21.

In the timepiece of this embodiment, the provision of the light wavelength conversion layer 134 on the upper side of the solar battery unit 120 makes it possible to absorb excessive ultraviolet light and convert it to light with a wavelength contributing to power generation, thereby improving the power generation efficiency of the solar battery unit 120.

Further, the electric connection between the liquid crystal display panel 90 and the circuit board 132 and the electric connection between the solar battery unit 120 and the circuit board 132 are established through the use of the zebra rubber connectors, made of the same material, thereby unifying the materials and uniforming the connections.

Furthermore, a zebra rubber connector is used for an electric connection between the lower auxiliary light source 119 and the circuit board 132, making it possible to establish all the connections through the zebra rubber connectors.

Figure 31:
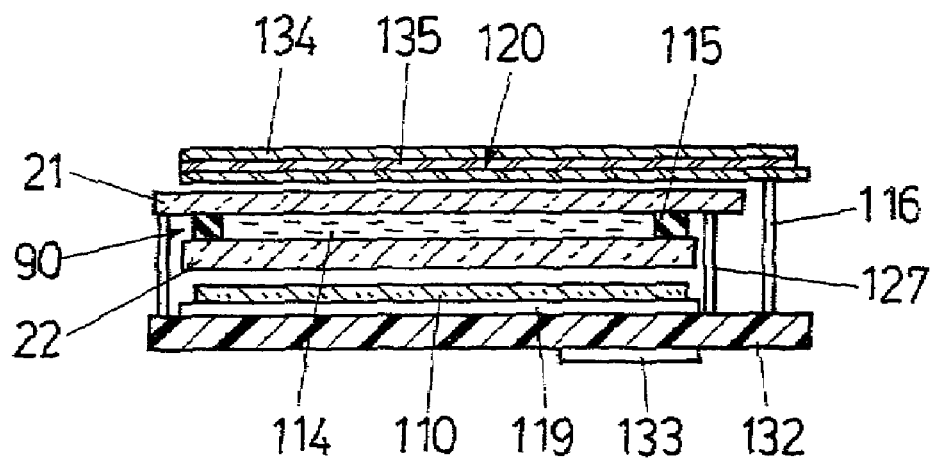
FIG. 31 is a cross-sectional view similar to FIG. 30, showing only an inner module of a fifth embodiment of the timepiece according to the present invention.

Fifth Embodiment of Timepiece: FIG. 31

Next, the fifth embodiment of the timepiece according to the present invention is explained with FIG. 31.

FIG. 31 is a cross-sectional view similar to FIG. 30, showing only an inner module of the fifth embodiment of the timepiece according to the present invention, in which the same numerals are given to components corresponding to those in FIG. 21 and FIG. 29, and thus the description thereof is omitted.

The fifth embodiment is characterized in that an ultraviolet light cut layer 135 and a light wavelength conversion layer 134 are provided on the upper side of a solar battery unit 120, and that a zebra rubber connector is used for a connection between the solar battery unit 120 and a circuit board 132 similarly to a connection between a liquid crystal display panel 90 and the circuit board 132.

As in the above-described fourth embodiment, a reflection-type polarizing film 110, of which one polarizing optical axis is a transmission axis and a polarizing optical axis substantially perpendicular thereto is a reflection axis, is bonded to the lower side of a second substrate 22 of the liquid crystal display panel 90 with an acrylic adhesive. The reflection-type polarizing film 110 has a laminated structure constituted of several-hundred layers of polymers and co-polymers, in which a difference in refractive index is generated in an axis by uniaxially stretching them, and the difference in the refractive index depending on wavelength generates polarization in transmission and reflection.

A lower auxiliary light source 119 is provided below the reflection-type polarizing film 110. As the lower auxiliary light source 119, an electro-luminescent (EL) element is employed when importance is attached to a thin profile.

A predetermined gap is provided between the reflection-type polarizing film 110 and the second substrate 22, and the reflection-type polarizing film 110 is fixed to the lower auxiliary light source 119 with an adhesive (not shown). The provision of an air layer between the reflection-type polarizing film 110 and the second substrate 22 apparently improves a scattering property of the liquid crystal display panel because of a difference in refractive index between the second substrate 22, the air layer and the reflection-type polarizing film 110, which is effective.

When a color display is performed, it is effective to provide a transparent printed layer between the reflection-type polarizing film 110 and the second substrate 22.

The solar battery unit 120, the ultraviolet light cut layer 135 and the light wavelength conversion layer 134 are provided above a first substrate 21, thereby effectively using ultraviolet light for power generation and preventing light having excessive energy from entering the solar battery unit 120 and a liquid crystal layer 114.

Figure 32:
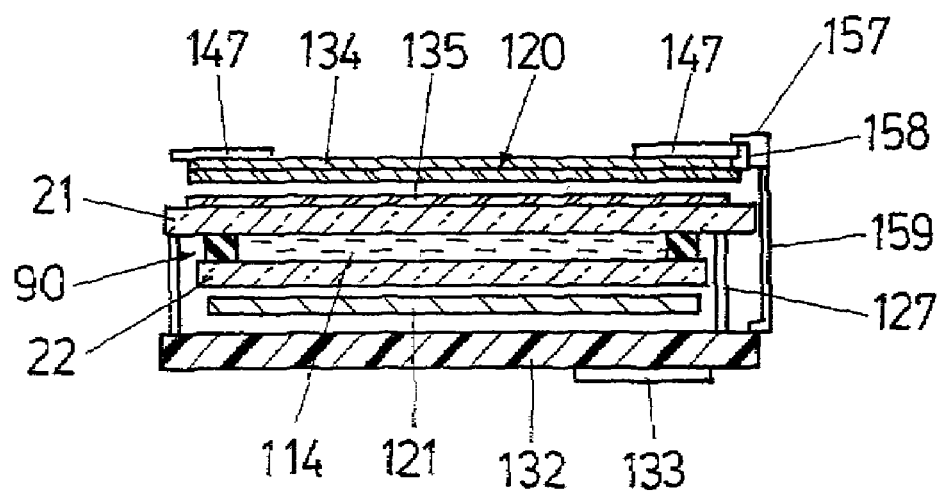
FIG. 32 is a cross-sectional view similar to FIG. 30, showing only an inner module of a sixth embodiment of the timepiece according to the present invention.

Sixth Embodiment of Timepiece: FIG. 32

Next, the sixth embodiment of the timepiece according to the present invention is explained with FIG. 32.

FIG. 32 is a cross-sectional view similar to FIG. 30, showing only an inner module of the sixth embodiment of the timepiece according to the present invention, in which the same numerals are given to components corresponding to those in FIG. 21 and FIG. 29, and the description thereof is omitted.

The sixth embodiment is characterized in that an ultraviolet light cut layer 135 is bonded to the upper side of a first substrate 21 of a liquid crystal display panel 90, and, with a predetermined gap, a solar battery unit 120 and a light wavelength conversion layer 134 are provided, and that an upper auxiliary light source 147 is provided on the upper side of the light wavelength conversion layer 134.

The ultraviolet light cut layer 135 is provided on the upper side of the first substrate 21 of the liquid crystal display panel 90. The ultraviolet light cut layer 135 has a transmittance of about 1% with respect to light with a wavelength shorter than 380 nanometers (nm), transmits 50% of light with a wavelength of 400 nanometers (nm), and transmits about 90% of light with a wavelength of 420 nanometers (nm).

Above the ultraviolet light cut layer 135, the solar battery unit 120 is provided with the predetermined gap interposed therebetween.

Further, the light wavelength conversion layer 134 which emits light ranging from 400 nanometers (nm) to 800 nanometers (nm) when making a transition into a ground state after an energy state being excited by light with a wavelength of 300 nanometers (nm) to 380 nanometers (nm), is provided on the solar battery unit 120. The light wavelength conversion layer 134 contains a rare earth oxide in a glass material. The emission is of a specific wavelength range within a wavelength range of 400 nanometers (nm) to 800 nanometers (nm). For example, ultraviolet light is absorbed and green light or red light is emitted.

The light wavelength conversion layer 134 can convert light which deteriorates a power generation layer of the solar battery unit 120 to light effective in power generation of the solar battery unit 120 in wavelength.

Further, the light with a short wavelength can be blocked by the ultraviolet light cut layer 135. These can prevent deterioration of the solar battery unit 120 and deterioration of a liquid crystal layer 114, and further prevent deterioration of a plastic substrate constituting the solar battery unit 120 and deterioration of a resin which bonds the first substrate 21 and the solar battery unit 120.

Furthermore, the provision of the gap between the ultraviolet light cut layer 135 and the solar battery unit 120 can prevent dust which appears between the ultraviolet light cut layer 135 and the solar battery unit 120 and breakage of the solar battery unit 120 which occurs in repairing the ultraviolet light cut layer 135 caused by distortion of the ultraviolet light cut layer 135 as compared to the case in which the ultraviolet light cut layer 135 is bonded to the solar battery unit 120.

Figure 33:
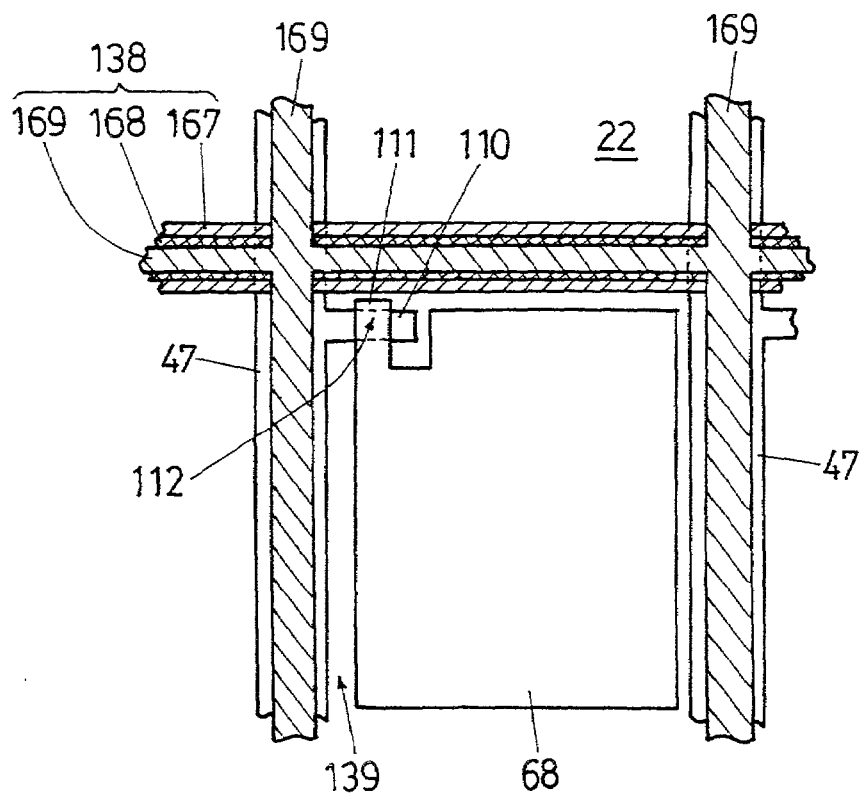
FIG. 33 is an enlarged plan view of a pixel portion and its surroundings showing another example of the liquid crystal display device used in the timepiece according to the present invention.
Figure 34:
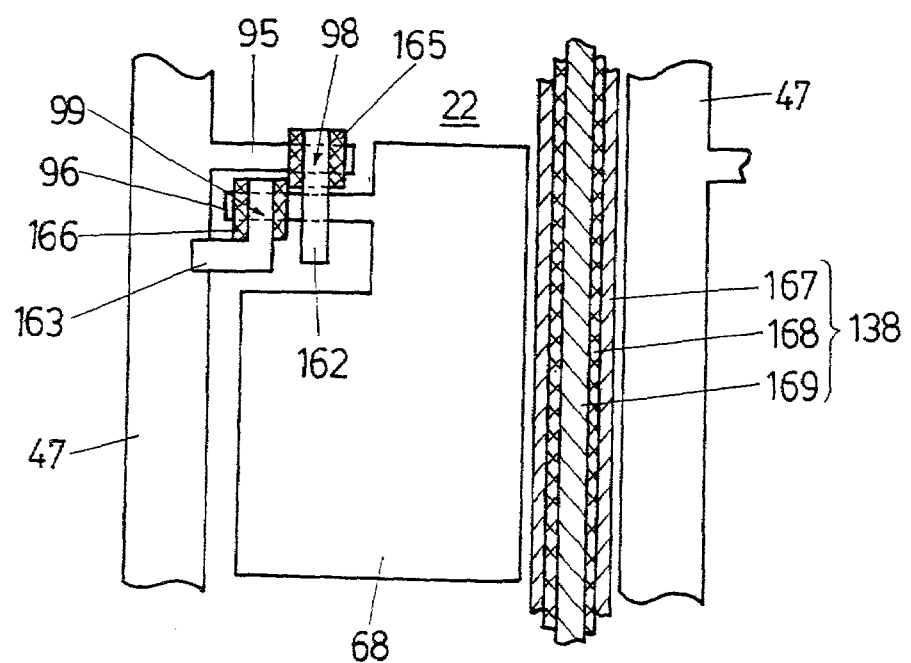
FIG. 34 is an enlarged plan view of a pixel portion and its surroundings showing still another example of the liquid crystal display device used in the timepiece according to the present invention.

Other Structural Examples of Liquid Crystal Display Device: FIG. 33 and FIG. 34

Next, other structural examples of the liquid crystal display device used in the timepiece according to the present invention are explained.

FIG. 33 is an enlarged plan view of a pixel portion and its surroundings of the liquid crystal display device.

This liquid crystal display device is characterized in that a solar battery unit and a liquid crystal display panel having thin film diodes (TFD) as two-terminal active elements are provided on the same substrate.

In this liquid crystal display device, as shown in FIG. 33, data electrodes 47 each made of a tantalum (Ta) film are formed in vertical stripes on the inner surface (surface on the liquid crystal layer side) of a second transparent substrate 22 which is an active substrate of the liquid crystal display panel, and a display electrode 68 made of an indium oxide (ITO) film is formed between adjacent data electrodes 47 and 47.

Further, a lower electrode 110 is extended from each data electrode 47 for each display electrode 68, and a tantalum oxide ($Ta_2O_5$) film (not shown) made by anodizing a tantalum film is formed on the front face of the lower electrode 110 as a nonlinear resistance layer.

Further, an upper electrode 111 is extended from each display electrode 68 to intersect and overlap the lower electrode 110 through the nonlinear resistance layer. The lower electrode 110, the nonlinear resistance layer and the upper electrode 111 constitute a thin film diode 112.

Since a predetermined voltage is applied to the data electrode 47 to apply a voltage between the display electrode 68 and an opposed electrode, which is formed on the inner surface of a first substrate, opposed to the display electrode 68 with a not shown liquid crystal layer interposed therebetween to thereby perform a display, the liquid crystal layer around the display electrode 68 is not caused to change by signal, and thus an effective display can not be performed there.

Therefore, the solar battery unit is provided around the display electrodes 68. More specifically, a transparent insulating film is formed on the entire upper surface of the second substrate 22 which is formed with the data electrodes 47, the display electrodes 68 and the thin film diodes 112.

Then, first electrodes 167 are formed in horizontal stripes close to the display electrodes 68 on the insulating film, power generating semiconductor layers 168 each made of an amorphous silicon (a-Si) film are also formed in horizontal stripes overlapped on the first electrodes 167. Further, second electrodes 169 are formed in a lattice shape overlapped on the power generating semiconductor layers 168 and above the data electrodes 47 to constitute power generation layers 138 where the first electrodes 167, the semiconductor layers 168 and the second electrodes 169 overlap one upon another.

As described above, the power generation portions 138 of the solar battery unit are arranged around the display electrodes 68. Further, since a transparent conductive film is used for the not shown opposed electrode, the power generation portion 138 is disposed in a direction perpendicular to the data electrode 47, making it possible to supply predetermined light energy to the solar battery unit without influence exerted upon display performance.

In this solar battery unit, a region corresponding to the display electrode 68, provided with no power generation portion 138, is a transmission portion 139, enabling a bright display by the liquid crystal display panel.

Further, the arrangement of the second electrodes 169 in a lattice shape and the arrangement of the semiconductor layers 168 in stripes make it possible that when an auxiliary light source is disposed below the liquid crystal display panel and turned on, light to an ineffective display region around the display electrodes 68 can be blocked, which is extremely effective in improvement of display quality and in the power generation efficiency of the solar battery unit.

FIG. 34 is an enlarged plan view of a pixel portion and its surroundings showing still another example of the liquid crystal display device used in the timepiece according to the present invention.

In this liquid crystal display device, a power generation portion of a solar battery unit, a data electrode and a display electrode of a liquid crystal display panel and a pair of thin film diodes (TFD) which are two-terminal active elements are provided in the same substrate.

In this liquid crystal display device, data electrodes 47 each made of a transparent conductive film are formed in vertical stripes on the inner surface (surface on the liquid crystal layer side) of a second transparent substrate 22 which is an active substrate of the liquid crystal display panel, and a display electrode 68 made of an indium tin oxide (ITO) film which is a transparent conductive film is formed between adjacent data electrodes 47 and 47.

Further, a first lower electrode 95 is integrally provided extending from each data electrode 47 for each display electrode 68. Furthermore, a second lower electrode 96 is integrally provided extending from the display electrode 68 to be parallel to the first lower electrode 95. A first electrode 167 of a power generation portion 138 of the solar battery unit is formed in a vertical stripe in a gap between the data electrode 47 and the display electrode 68.

The data electrodes 47, the first lower electrodes 95, the display electrodes 68, the second lower electrodes 96 and the first electrodes 167 of the power generation portions 138 are simultaneously pattern-formed directly on the second substrate 22 using the same transparent conductive film.

Then, semiconductor layers 165, 166, 168 each made of an amorphous silicon (a-Si) film and having a PIN junction are provided on the first lower electrode 95, the second lower electrode 96 and the first electrode 167 constituting the power generation portion 138, respectively. All of these semiconductor layers are formed of the above-described same semiconductor.

Thereafter, a first upper electrode 162 which connects the semiconductor layer 165 and the second lower electrode 96 is provided, constituting a first thin film diode 98 by the first lower electrode 95, the semiconductor layer 165 and the first upper electrode 162.

Further, a second upper electrode 163 which connects the semiconductor layer 166 and the data electrode 47 is provided, constituting a second thin film diode 99 by the second lower electrode 96, the semiconductor layer 166 and the second upper electrode 163.

Since the first thin film diode 98 and the second thin film diode 99 are connected to each other in a ring-like shape, photoelectromotive force generated by the thin film diodes 98 and 99 is consumed in the ring. This can decrease influence exerted upon display quality of the liquid crystal display device.

A second electrode 169 is formed in a vertical stripe of a transparent conductive film on the semiconductor layer 168 which is formed on the first electrode 167 of the solar battery unit, thereby constituting the power generation portion 138. The power generation portion 138 can be provided on the data electrode 47, but such provision makes it difficult to take out electric power because the data electrode 47 is used for driving the thin film diodes 98 and 99, and thus the data electrode 47 and the power generation portion 138 are separately constituted.

When the thin film diode is connected to a scanning electrode (horizontal electrode), the power generation portion 138 of the solar battery unit is preferably disposed parallel to the scanning electrode.

In order to apply a signal to the data electrode 47 and take out electric power generated by the power generation portion 138, there is a method of connecting them to wirings through a flexible print circuit (FPC) or a chip-on-glass (COG). Alternatively, it is possible to employ a method that the data electrode 47 and the second electrode 169 are led out to this side from the paper surface, and the data electrodes 47 are connected to each other through a second electrode connecting portion (not shown) at a position closer to the outer form of a first substrate (not shown) from a portion where the data electrode 47 is connected to an external circuit, and connected through a first electrode connecting portion (not shown) at the back side of the paper surface.

Alternatively, a method is also effective that the power generation portion 138 is made larger in width than the data electrode 47 at a position where a sealing agent exists, and a conductive paste is printed on each first electrode 167 or each second electrode 169 to connect to a first electrode connecting portion or a second electrode connecting portion (not shown) which is provided on a second substrate opposed to the fist substrate.

Further, a nonlinear resistance element and the power generation portion 138 are provided on the same substrate, thus reducing a load on the connection. Furthermore, the first electrode 167 and the second electrode 169 of the power generation portion 138 are each made of a transparent conductive film, thereby enabling power generation even if the power generation portion 138 is provided either on the upper side or on the lower side of the liquid crystal layer (not shown).

Especially, in the case of a liquid crystal layer mode in which the liquid crystal layer exhibits absorption, scattering or reflection characteristics and light passing through the liquid crystal layer is decreased by the liquid crystal layer, the second substrate provided with the power generation portions 138 is disposed on the visual recognition side, thereby making it possible to secure a large quantity of power generation.

Other Modifications

Even when the solar battery unit is disposed on the visual recognition side of the liquid crystal display panel, it is also possible to constitute the solar battery unit in a lattice shape as in the example shown in FIG. 11 and FIG. 12 and sandwich the power generating semiconductor layer made of an amorphous silicon (a-Si) film at the intersection portion of the first electrode in a horizontal stripe and the second electrode in a vertical stripe, thereby forming the power generation portion.

Even in such a solar battery unit, the transmission portion can occupy an large area corresponding to the display electrode forming the pixel portion of the liquid crystal display panel, enabling a bright display by the liquid crystal display panel and also enabling a performance of a transmission-type display by disposing an auxiliary light source below the liquid crystal display panel.

Although the example in which the two-terminal type thin film diode is provided as the nonlinear resistance element (switching element) provided in the liquid crystal display panel is given, the three-terminal type nonlinear resistance element typified by the thin film transistor (TFT) as shown in FIG. 15 may be provided.

INDUSTRIAL APPLICABILITY

A timepiece according to the present invention is equipped with a liquid crystal display device having a function of generating electric power, in which a function of generating electric power by a solar battery can be obtained in an area of a liquid crystal display panel, thereby securing a sufficient area for a liquid crystal display even if the liquid crystal display device is installed in a small-sized timepiece and also making it possible to eliminate power supply from the outside and battery exchange, thus solving the environmental problems and problems on the supply of energy, with a realization of a maintenance-free timepiece. Moreover, the timepiece is excellent in visual design because the solar battery is not viewed from the outside of the timepiece.

What is claimed is:

1. A liquid crystal display device, comprising:
   a liquid crystal display panel including a transmission portion;
   a solar battery facing at least a part of a surface opposite to a visual recognition side of said liquid crystal display panel and absorbing a visible light to generate electric power;
   a first polarizing film provided on the visual recognition side of said liquid crystal display panel, said first polarizing film having a polarization transmission axis; and
   a second polarizing film provided on a side opposite the visual recognition side of said liquid crystal panel, said second polarizing film having a polarization transmission axis substantially perpendicular to the polarization transmission axis of said first polarizing film,
   wherein light is applied to said solar battery through the transmission portion of said liquid crystal display panel to generate electric power, and a display by said liquid crystal display panel is performed using said solar battery as an absorbing plate, and
   wherein said liquid crystal display panel, said first polarizing film and said second polarizing film are in a transmission state where light is applied to the solar battery through said liquid crystal display panel when a voltage applied to the liquid crystal panel is off.

2. The liquid crystal display device according to claim 1, wherein a film having characteristics of transmitting light within a wavelength region matching with wavelength absorbed by a power generation portion of said solar battery is provided on the visual recognition side of said solar battery.

3. The liquid crystal display device according to claim 2, wherein
   a power generation quantity adjustment region for changing a transmittance is provided at a part of a display region of said liquid crystal display panel to adjust a quantity of power generation of said solar battery.

4. The liquid crystal display device according to claim 3, wherein
   said liquid crystal display panel is a liquid crystal display panel for a timepiece.

5. The liquid crystal display device according to claim 2, wherein
   means for conducting a control to increase a transmittance of said liquid crystal display panel is provided to increase a quantity of power generation of said solar battery while said liquid crystal display panel is in a non-driving display state.

6. The liquid crystal display device according to claim 5, wherein
   said liquid crystal display panel is a liquid crystal display panel for a timepiece.

7. The liquid crystal display device according to claim 2, wherein
   a liquid crystal layer of said liquid crystal display panel is a mixed liquid crystal layer containing a polymer in a liquid crystal.

8. The liquid crystal display device according to claim 7, wherein
   said liquid crystal display panel is a liquid crystal display panel for a timepiece.

9. The liquid crystal display device according to claim 2, wherein
   a liquid crystal layer of said liquid crystal display panel is a twisted nematic liquid crystal layer or a super twisted nematic liquid crystal layer, polarizing films are provided on the visual recognition side and on the opposite side thereto respectively with said liquid crystal layer interposed therebetween, and said polarizing film provided on the opposite side to the visual recognition side is a reflection-type polarizing film of which one polarization axis is a transmission axis and another polarization axis substantially perpendicular thereto is a reflection axis.

10. The liquid crystal display device according to claim 9, wherein
said liquid crystal display panel is a liquid crystal display panel for a timepiece.

11. The liquid crystal display device according to claim 2, wherein
said liquid crystal display panel is a liquid crystal display panel for a timepiece.

12. The liquid crystal display device according to claim 1, wherein a printed layer having substantially same spectral reflectance as that of a power generation portion of said solar battery is provided on non-power-generation portions of said solar battery.

13. The liquid crystal display device according to claim 12, wherein
a power generation quantity adjustment region for changing a transmittance is provided at a part of a display region of said liquid crystal display panel to adjust a quantity of power generation of said solar battery.

14. The liquid crystal display device according to claim 13, wherein
said liquid crystal display panel is a liquid crystal display panel for a timepiece.

15. The liquid crystal display device according to claim 12, wherein
means for conducting a control to increase a transmittance of said liquid crystal display panel is provided to increase a quantity of power generation of said solar battery while said liquid crystal display panel is in a non-driving display state.

16. The liquid crystal display device according to claim 15, wherein
said liquid crystal display panel is a liquid crystal display panel for a timepiece.

17. The liquid crystal display device according to claim 12, wherein
a liquid crystal layer of said liquid crystal display panel is a mixed liquid crystal layer containing a polymer in a liquid crystal.

18. The liquid crystal display device according to claim 17, wherein
said liquid crystal display panel is a liquid crystal display panel for a timepiece.

19. The liquid crystal display device according to claim 12, wherein
a liquid crystal layer of said liquid crystal display panel is a twisted nematic liquid crystal layer or a super twisted nematic liquid crystal layer, polarizing films are provided on the visual recognition side and on the opposite side thereto respectively with said liquid crystal layer interposed therebetween, and said polarizing film provided on the opposite side to the visual recognition side is a reflection-type polarizing film of which one polarization axis is a transmission axis and another polarization axis substantially perpendicular thereto is a reflection axis.

20. The liquid crystal display device according to claim 19, wherein
said liquid crystal display panel is a liquid crystal display panel for a timepiece.

21. The liquid crystal display device according to claim 12, wherein
said liquid crystal display panel is a liquid crystal display panel for a timepiece.

22. The liquid crystal display device according to claim 1, wherein
a film for changing a color of said solar battery is provided between said solar battery and said liquid crystal display panel.

23. The liquid crystal display device according to claim 22, wherein
said film for changing a color of said solar battery is a cholesteric liquid crystal film.

24. The liquid crystal display device according to claim 23, wherein
a liquid crystal layer of said liquid crystal display panel is a twisted nematic liquid crystal layer or a super twisted nematic liquid crystal layer, and a polarizing film is provided on the visual recognition side and a cholesteric liquid crystal film is provided on the opposite side thereto respectively with said liquid crystal layer interposed therebetween.

25. The liquid crystal display device according to claim 24, wherein
said liquid crystal display panel is a liquid crystal display panel for a timepiece.

26. The liquid crystal display device according to claim 22, wherein
a display is performed by a change in color of said liquid crystal display panel and a spectral reflection characteristic of said film.

27. The liquid crystal display device according to claim 22, wherein
said liquid crystal display panel is a liquid crystal display panel for a timepiece.

28. The liquid crystal display device according to claim 1, wherein
a power generation quantity adjustment region for changing a transmittance is provided at a part of a display region of said liquid crystal display panel to adjust a quantity of power generation of said solar battery.

29. The liquid crystal display device according to claim 28, wherein
said liquid crystal display panel is a liquid crystal display panel for a timepiece.

30. The liquid crystal display device according to claim 1, wherein
means for conducting a control to increase a transmittance of said liquid crystal display panel is provided to increase a quantity of power generation of said solar battery while said liquid crystal display panel is in a non-driving display state.

31. The liquid crystal display device according to claim 30, wherein
said liquid crystal display panel is a liquid crystal display panel for a timepiece.

32. The liquid crystal display device according to claim 1, wherein
a display is performed by a change in color of said liquid crystal display panel and a spectral reflection characteristic of said solar battery.

33. The liquid crystal display device according to claim 1, wherein
a liquid crystal layer of said liquid crystal display panel is a mixed liquid crystal layer made by mixing a dichroic dye in a liquid crystal.

34. The liquid crystal display device according to claim 33, wherein
said liquid crystal display panel is a liquid crystal display panel for a timepiece.

35. The liquid crystal display device according to claim 1, wherein a liquid crystal layer of said liquid crystal display panel is a mixed liquid crystal layer containing a polymer in a liquid crystal.

36. The liquid crystal display device according to claim 35, wherein said liquid crystal display panel is a liquid crystal display panel for a timepiece.

37. The liquid crystal display device according to claim 1, wherein a liquid crystal layer of said liquid crystal display panel is a twisted nematic liquid crystal layer or a super twisted nematic liquid crystal layer, polarizing films are provided on the visual recognition side and on the opposite side thereto respectively with said liquid crystal layer interposed therebetween, and said polarizing film provided on the opposite side to the visual recognition side is a reflection-type polarizing film of which one polarization axis is a transmission axis and another polarization axis substantially perpendicular thereto is a reflection axis.

38. The liquid crystal display device according to claim 37, wherein said liquid crystal display panel is a liquid crystal display panel for a timepiece.

39. The liquid crystal display device according to claim 1, wherein said liquid crystal display panel is a liquid crystal display panel for a timepiece.

* * * * *